US011306661B1

(12) United States Patent
Brightwell et al.

(10) Patent No.: US 11,306,661 B1
(45) Date of Patent: Apr. 19, 2022

(54) METHODS AND APPARATUS TO OPERATE A GAS TURBINE ENGINE WITH HYDROGEN GAS

(71) Applicant: General Electric Company, Schenectady, NY (US)

(72) Inventors: Eloise Brightwell, West Chester, OH (US); Douglas M. Fortuna, West Chester, OH (US); Gilbert Henry Badeer, West Chester, OH (US); Steven Keith Handelsman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/112,615

(22) Filed: Dec. 4, 2020

(51) Int. Cl.
*F02C 7/00* (2006.01)
*F02C 7/232* (2006.01)
*F02C 7/22* (2006.01)
*F02C 9/40* (2006.01)
*F23R 3/36* (2006.01)

(52) U.S. Cl.
CPC ............... *F02C 7/232* (2013.01); *F02C 7/22* (2013.01); *F02C 9/40* (2013.01); *F23R 3/36* (2013.01); *F05D 2220/32* (2013.01); *F05D 2240/35* (2013.01); *F05D 2270/07* (2013.01); *F05D 2270/08* (2013.01)

(58) Field of Classification Search
CPC .... F02C 3/20; F02C 3/30; F02C 7/232; F02C 7/22; F02C 9/40; F23R 3/36; F23R 2900/00004; F05D 2220/32; F05D 2240/35; F05D 2270/07; F05D 2270/08; F05D 2260/602; F23K 5/18; F23K 2301/203
See application file for complete search history.

(56) References Cited

U.S. PATENT DOCUMENTS

| 4,508,064 | A | 4/1985 | Watanabe |
| 8,056,344 | B2 | 11/2011 | Remy et al. |
| 9,464,573 | B2 | 10/2016 | Remy et al. |
| 10,041,417 | B2 | 8/2018 | Horikawa et al. |

(Continued)

FOREIGN PATENT DOCUMENTS

| CN | 107725192 A | 2/2018 |
| DE | 2933932 A1 | 3/1981 |
| WO | 9220913 A1 | 11/1992 |

*Primary Examiner* — Edwin Kang
(74) *Attorney, Agent, or Firm* — Hanley, Flight & Zimmerman, LLC

(57) ABSTRACT

Methods and apparatus to operate a gas turbine engine with hydrogen gas are disclosed. An example combustor nozzle apparatus of a gas turbine engine includes a first circuit to transport a blend of hydrogen gas, inert gas, and/or other combustible gas from a supply to a gas turbine combustor, the blend of hydrogen gas, inert gas, and/or other combustible gas including between 100% hydrogen gas, 100% inert gas, or 100% other combustible gas, a second circuit to transport water from the supply to the gas turbine combustor, and a nozzle tip. The nozzle tip includes a first outlet in connection with the second circuit to provide the water to the gas turbine combustor, and a second outlet in connection with the first circuit, the second outlet concentrically positioned within the first outlet to provide the blend of hydrogen gas, inert gas, and/or other combustible gas to the gas turbine combustor.

20 Claims, 12 Drawing Sheets

(56) References Cited

U.S. PATENT DOCUMENTS

| | | | |
|---|---|---|---|
| 10,330,050 B2 | 6/2019 | Okada et al. | |
| 2005/0193741 A1* | 9/2005 | Iasillo | F02C 3/30 60/776 |
| 2009/0301096 A1 | 12/2009 | Remy et al. | |
| 2010/0293959 A1 | 11/2010 | Remy et al. | |
| 2011/0283710 A1* | 11/2011 | Brunhuber | F23N 1/002 60/780 |
| 2013/0055637 A1* | 3/2013 | Ariyapadi | C10K 1/004 48/119 |
| 2013/0068307 A1* | 3/2013 | Hains | F02C 7/236 137/1 |
| 2013/0127163 A1* | 5/2013 | Palamara | F01K 17/025 290/2 |
| 2014/0150445 A1* | 6/2014 | Huntington | F02C 3/34 60/776 |
| 2014/0283498 A1 | 9/2014 | Horikawa et al. | |
| 2015/0059351 A1* | 3/2015 | Kiso | C10J 3/466 60/773 |
| 2016/0169160 A1 | 6/2016 | Okada et al. | |
| 2018/0112604 A1* | 4/2018 | Akiyama | F02C 3/22 |
| 2018/0259187 A1* | 9/2018 | Lu | F23K 5/007 |
| 2019/0137104 A1* | 5/2019 | Jain | F23R 3/286 |

\* cited by examiner

METHODS AND APPARATUS TO OPERATE A GAS TURBINE ENGINE WITH HYDROGEN GAS

FIELD OF THE DISCLOSURE

This disclosure relates generally to gas turbine engines, and, more particularly, to methods and apparatus to operate a gas turbine engine with hydrogen gas.

BACKGROUND

In recent years, gas turbine engines have utilized mixtures of hydrogen gas and conventional fuels because of the advantages hydrogen gas provides. Specifically, hydrogen is an abundantly available element that has beneficial properties for combustion in gas turbine engines, such as reduced carbon emissions, lower fuel consumption (pounds per hour (pph)), greater energy production, light weight, and high combustion rate and temperature. During combustion of the mixture of hydrogen gas and conventional fuels chemical energy and thermal energy are converted into mechanical energy. The mechanical energy produced as a result of the combustion can drive downstream turbine blades and provide propulsion to an aircraft or drive a shaft of a generator that produces electric current.

BRIEF SUMMARY

Methods and apparatus to operate a gas turbine engine with hydrogen gas are disclosed.

Certain examples provide an example combustor nozzle apparatus of a gas turbine engine including a first circuit to transport a blend of at least one of hydrogen gas, inert gas, or other combustible gas from a supply to a gas turbine combustor, the blend of at least one of hydrogen gas, inert gas, or other combustible gas including between 100% hydrogen gas, 100% inert gas, or 100% other combustible gas, a second circuit to transport water from the supply to the gas turbine combustor during a first mode of operation, and a nozzle tip. The nozzle tip includes a first outlet in connection with the second circuit the water to the gas turbine combustor, and a second outlet in connection with the first circuit. The second outlet is concentrically positioned within the first outlet to provide the blend of at least one of hydrogen gas, inert gas, or other combustible gas to the gas turbine combustor.

Certain examples provide an example method to operate a gas turbine engine with up to 100% hydrogen gas as fuel including purging a gas turbine combustor and a first circuit of a combustor nozzle with an inert gas or an other combustible gas, injecting hydrogen gas into the gas turbine combustor through the first circuit of the nozzle, the first circuit including a blend of at least one of hydrogen gas, inert gas, or other combustible gas, wherein the blend of at least one of hydrogen gas, inert gas or other combustible gas includes between 100% hydrogen gas and 100% inert gas or 100% other combustible gas, injecting water into the gas turbine combustor through a second circuit of the combustor nozzle, and increasing a percentage of hydrogen gas in the blend of at least one of hydrogen gas, inert gas, or other combustible gas to up to 100% hydrogen gas as the gas turbine engine maintains or increases a power output.

Certain examples provide an example apparatus of a gas turbine engine including a memory, and one or more processors communicatively coupled to the memory, the memory including instructions that, when executed, cause the one or more processors to purge a first circuit of a combustor nozzle and a gas turbine combustor with an inert gas or an other combustible gas, inject hydrogen gas into the gas turbine combustor through the first circuit of the nozzle, the first circuit of the nozzle including a blend of at least one of hydrogen gas, inert gas, or other combustible gas, the blend of at least one of hydrogen gas, inert gas, or other combustible gas including between 100% hydrogen gas and 100% inert gas or 100% other combustible gas, inject water into the gas turbine combustor through a second circuit of the combustor nozzle, and increase a percentage of hydrogen gas in the blend of at least one of hydrogen gas, inert gas, or other combustible gas to up to 100% hydrogen gas as the gas turbine engine maintains or increases a power output.

Figure 1:
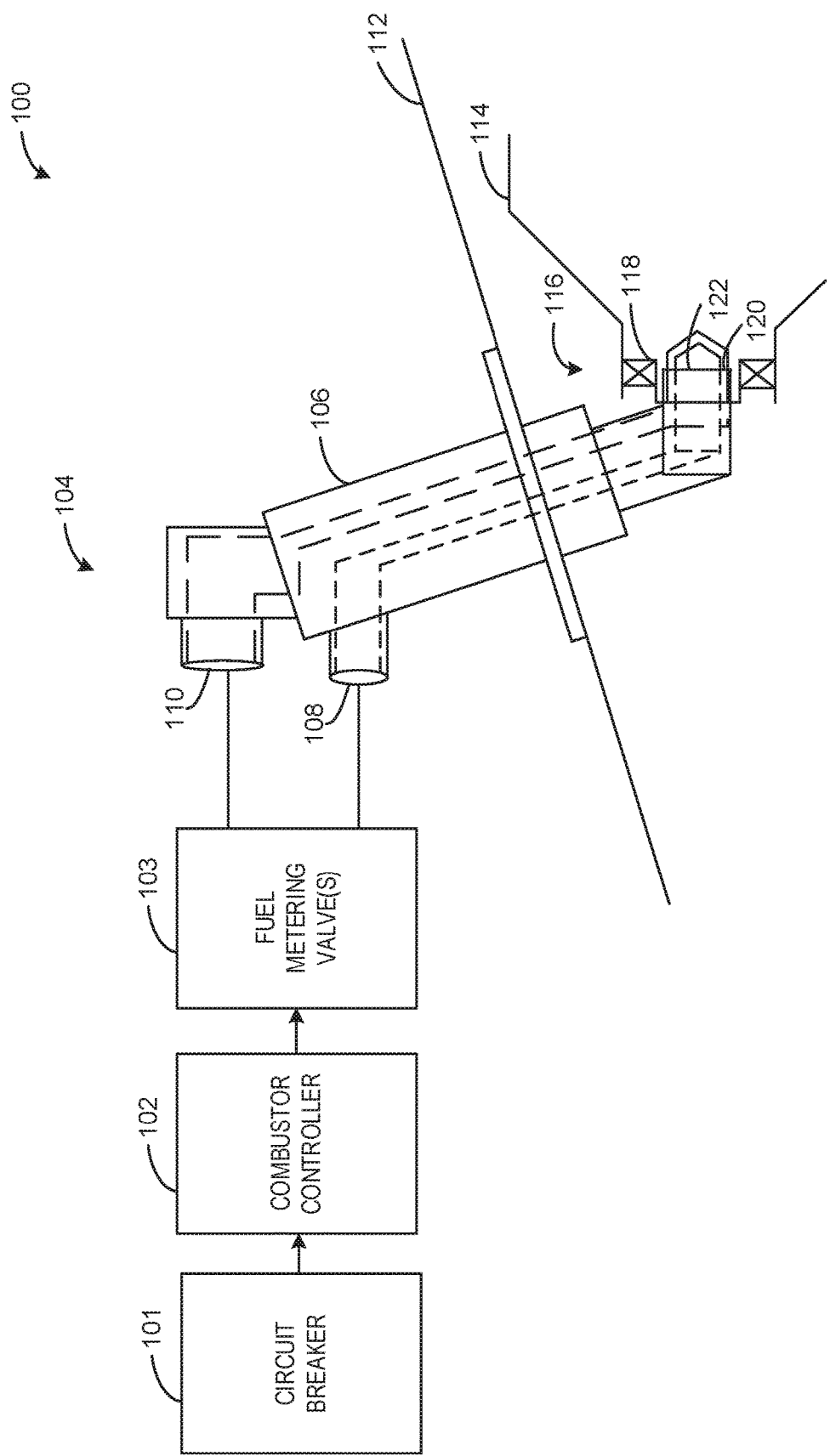
FIG. 1 is an illustration of an example fuel nozzle of an example gas turbine engine.

The figures are not to scale. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Hydrogen is an abundant fuel source that has additional beneficial properties for combustion in gas turbine engines, such as a high combustion rate and temperature, which can increase an efficiency of the gas turbine engine. Gas turbine engines produce power and/or mechanical drive for aeronautics, marine applications, gear boxes, off-shore power generators, terrestrial power plants, etc. Gas turbine engines can utilize hydrogen gas in addition to other conventional fuels to convert thermal and chemical energy to mechanical energy via combustion. Specifically, a gas turbine engine that utilizes hydrogen gas during combustion can incrementally increase a quantity of energy produced compared to a conventional gas turbine engine that does not utilize hydrogen gas. Further, utilizing hydrogen gas within gas turbine engines reduces harmful carbon emissions, which is a focus of power producers given the emission regulations that have been implemented by legislation.

In some examples, the greater combustion rate of hydrogen results in a higher volumetric flow rate of hydrogen gas compared to conventional fuels. Further, the increased flame temperature resulting from the combustion of hydrogen gas can increase harmful nitrogen oxide emissions in addition to increasing a risk of combustion flashback and flame holding in the fuel system. In some examples, combustion flashback and/or flame holding can cause potential deflagration combustion, which presents a catastrophic risk to operators. Further, increased nitrogen oxide emissions are harmful for the environment as the nitrogen oxide emissions react with organic compounds in the atmosphere hindering an ability of the ozone layer to protect the planet from harmful radiation. Accordingly, the hinderances and/or risks that result from utilizing hydrogen gas have limited the implementation thereof as fuel in gas turbine engines.

In known implementations, multiple nozzles can be utilized to induce water and hydrogen gas into the combustor. In some instances, a nozzle that induces fuel into the combustor includes a chamber for mixing the fuel with water vapor before the fuel is injected into the combustor. In some examples, a valve is configured to increase a mass flow of hydrogen at low power operations of a turbine and stop injections of hydrogen at high power operations. In some examples, hydrocarbon fuel is supplied to a combustor at all power operations of the gas turbine engine while hydrogen gas is induced at low-power operations and terminated at mid-power and high-power operations. In some examples, hydrogen fuel is utilized in a fuel blend in combination with liquefaction gas, natural gas, and/or coal gas. In some examples, hydrogen fuel accounts for up to 75% of the fuel blend at predetermined power operations. However, higher volumes of hydrogen gas increases risks such as combustion flashback, flame holding, increased nitrogen oxide emissions, and deterioration in the gas turbine engine. As such, achieving an increased mix or usage of hydrogen fuel is problematic, if not impossible, using prior techniques.

Example methods and apparatus to operate a gas turbine engine with hydrogen gas are disclosed herein. In some examples, the gas turbine engine includes a combustor nozzle at least partially including a first circuit and a second circuit. In some examples, the first circuit transports a blend of at least one of hydrogen gas, inert gas (e.g., nitrogen gas, carbon dioxide, etc.), or other combustible gas (e.g., methane, propane, natural gas, etc.) from a supply to a gas turbine combustor. As used herein, the term "other combustible gas" refers to a combustible gas that is not hydrogen gas. For example, "other combustible gas" refers to any of methane, propane, natural gas, and/or any other gas that is combustible and includes other elements in addition to, or instead of, hydrogen. In some such examples, the blend of at least one of hydrogen gas, inert gas, or other combustible gas ranges between 100% hydrogen gas, 100% inert gas, or 100% other combustible gas. Additionally, the second circuit transports water or methane from the supply to the gas turbine combustor. In some such examples, the second circuit transports water during a first mode of operation and methane during a second mode of operation so the water and methane do not mix in the second circuit. In some examples, the first mode of operation corresponds to the first circuit transporting the hydrogen gas. Further, the second mode of operation corresponds to the first circuit transporting gases other than the hydrogen gas. In some examples, the first and second circuit include one or more flow paths to transport the hydrogen gas, inert gas, other combustible gas, water, or methane from the supply to the gas turbine combustor.

Further, the combustor nozzle includes a nozzle tip with a first outlet, a second outlet, and a third outlet. In some examples, the first outlet provides air flow to the gas turbine combustor. In some such examples, the first outlet includes an air swirler to mix the water or methane with the blend of at least one of hydrogen gas, inert gas, or other combustible gas. In some examples, the second outlet of the nozzle tip is in connection with the second circuit of the combustor nozzle. In some such examples, the second outlet is concentrically positioned within the first outlet to provide the water or methane to the gas turbine combustor. In other words, the first outlet circumferentially surrounds the second outlet. Additionally, the second outlet includes a water swirler to reduce a size of water droplets as they are induced into the gas turbine combustor. In some examples, at least one of the air swirler or the water swirler quenches a temperature within the gas turbine combustor. In some examples, the third outlet is in connection with the first circuit of the combustor nozzle. In some such examples, the third outlet is concentrically positioned within the second outlet to provide the blend of at least one of hydrogen gas, inert gas, or other combustible gas to the gas turbine combustor. In other words, the second outlet concentrically surrounds the third outlet. In some examples, an alternative nozzle can be utilized instead of the example combustor nozzle described above to operate the gas turbine engine with up to 100% hydrogen gas. In some examples, a nozzle includes three independent circuits that are configured to operate similar to the first and second circuits of the example combustor nozzle.

In some examples, a combustor controller is in communication with fuel metering valves associated with the combustor nozzle to control the blend of at least one of hydrogen gas, inert gas, or other combustible gas transported through the first circuit and the water or methane transported through the second circuit. In some examples, prior to injecting hydrogen gas into the gas turbine combustor through the first circuit of the combustor nozzle, the combustor controller purges the first circuit of the combustor nozzle and the gas turbine combustor with the inert gas or the other combustible gas. As used herein, the term "purge" encompasses deoxygenating a system and removing residual gases, such as hydrogen gas, from the system. Advantageously, the purge of the first circuit of the combustor nozzle and the gas turbine combustor prevents undesired combustion, such as combustion flashback and/or flame holding, that occurs when excess hydrogen gas and/or oxygen remain in the gas turbine engine.

In some examples, the combustor controller injects the inert gas and/or the other combustible gas through the first circuit and methane (e.g., natural gas) through the second circuit to accelerate the gas turbine engine to a synchronized idle speed. In some examples, the other combustible gas accelerates the gas turbine engine to the synchronized idle speed while purging so methane does not need to be injected through the second circuit. In some examples, the gas turbine engine operates at 10% of a rated power thereof at the synchronized idle speed. In some examples, the gas turbine engine circuit breaker is closed so the gas turbine engine can accept a load after accelerating to the synchronized idle speed. Further, the combustor controller injects water into the gas turbine combustor through the second circuit and injects hydrogen gas into the gas turbine combustor through the first circuit directly after water is induced into the gas turbine combustor. Accordingly, the combustor controller terminates injections of methane through the second circuit prior to inducing water so the water and methane do not mix. In some examples, the water manages the flame within the combustor to reduce a temperature thereof and, in turn, reduce nitrogen oxide emissions. Additionally, the water provides a thermal barrier between the flame within the combustor and hardware associated with the combustor to maintain a reliability and durability thereof. In some examples, the combustor controller increases a percentage of hydrogen gas in the blend of at least one of hydrogen gas, inert gas, or other combustible gas in the first circuit and simultaneously a volumetric flow rate of water increases in the second circuit as a power output and/or load of the gas turbine is maintained or increases. In some such examples, the gas turbine engine can operate with 100% hydrogen gas as fuel at a power output as low as 10% of the rated power and as high as 100% of the rated power.

In some examples, water reduces a temperature of a flame in the gas turbine combustor. In some such examples, the water provides the gas turbine combustor with nitrogen oxide emission abatement, flame management, and thermal protection to hardware associated with the gas turbine combustor. Specifically, water provides a thermal barrier between the hydrogen gas and the hardware associated with the combustor and/or the combustor nozzle to maintain the reliability and durability of the gas turbine engine. Additionally, utilizing a percentage of up to 100% hydrogen gas as fuel produces reduced carbon emissions, a lower fuel consumption, and a higher quantity of energy for the gas turbine engine compared to conventional jet engines.

FIG. 1 is an illustration of a fuel nozzle (e.g., a combustor nozzle) 104 of a gas turbine engine 100. In FIG. 1, the fuel nozzle 104 includes a nozzle body 106, a first circuit (e.g., an inside circuit) 108, a second circuit (e.g., an outside circuit) 110, and a nozzle tip 116. In FIG. 1, the nozzle tip 116 includes a first outlet 118, a second outlet 120, and a third outlet 122. In FIG. 1, the gas turbine engine 100 further includes a circuit breaker 101, a combustor controller 102, a fuel metering valve(s) 103, an engine case 112, and a combustor 114.

In the illustrated example of FIG. 1, a configuration of the circuit breaker 101 controls a load that the gas turbine engine 100 supports. For example, the circuit breaker 101 remains open to prevent the gas turbine engine 100 from encountering loads during initial stages of operation (e.g., prior to accelerating to a synchronized idle speed). Further, the circuit breaker 101 closes to impart loads on the gas turbine engine 100 after accelerating to the synchronized idle speed.

In the illustrated example of FIG. 1, the combustor controller 102 controls a blend of at least one of hydrogen gas, inert gas or other combustible gas transported through the first circuit 108. Additionally, the combustor controller 102 controls water or methane transported through the second circuit 110. In FIG. 1, the combustor controller 102 is in communication with the fuel metering valve(s) 103 to control the blend of at least one of hydrogen gas, inert gas, or other combustible gas and the water or methane transported through the first and second circuits 108, 110. In some examples, the fuel metering valve(s) 103 includes a hydrogen gas valve, an inert gas valve (e.g., a carbon dioxide valve, a nitrogen gas valve, etc.), an other combustible gas valve, a methane valve, and/or a water valve. In some examples, the combustor controller 102 determines a composition of the blend (e.g., a ratio of hydrogen gas to inert gas and/or other combustible gas) and a volumetric flow rate of water or methane based on a power output and/or load of the gas turbine engine 100. For example, the circuit breaker 101 closes and triggers the combustor controller 102 to terminate injections of methane though the second circuit 110 and induce water through the second circuit 110. Further, the combustor controller 102 adjusts the composition of the blend of at least one of hydrogen gas, inert gas, or other combustible gas after the gas turbine engine 100 accelerates to the synchronized idle speed. In some examples, the combustor controller 102 opens, closes, and/or modulates a position of the fuel metering valve(s) 103 to transport the blend of at least one of hydrogen gas, inert gas, or other combustible gas and water or methane to the fuel nozzle 104 and the combustor 114.

In the illustrated example of FIG. 1, the gas turbine engine 100 starts operations with a purge to remove residual gases and provide protection from undesired combustion. In some examples, the other combustible gas purges the fuel nozzle 104 and the combustor 114 while also accelerating the gas turbine engine 100 to the synchronized idle speed. Further, after reaching the synchronized idle speed, the circuit breaker 101 closes to allow the gas turbine engine 100 to safely accept loads and provide a steady thrust. For example, if the gas turbine engine 100 were to accept loads prior to reaching the synchronized idle speed, the fuel nozzle 104 and/or combustor 114 would not include a sufficient volume of the blend of at least one of hydrogen gas, inert gas, or other combustible gas which could result in operational control challenges, such as a stalled gas turbine engine 100. In some examples, the combustor controller 102 determines the fuel nozzle 104 and/or combustor 114 are sufficiently filled with the other combustible gas and/or the inert gas at the synchronized idle speed and initiates hydrogen gas injections without risking undesired combustion. Further, a percentage and/or volume of hydrogen gas safely ranges from 0% to 100% when the fuel nozzle 104 and/or combustor 114 have been purged and are sufficiently filled with the blend of at least one of hydrogen gas, inert gas, or other combustible gas. In some examples, a high percentage of hydrogen gas is injected into the gas turbine engine 100 while the gas turbine engine 100 operates anywhere between 10% and 100% rated power to reduce nitrogen oxide emissions.

In the illustrated example of FIG. 1, the nozzle body 106 is coupled to the engine case 112. In FIG. 1, the first circuit 108 of the fuel nozzle 104 induces the blend of at least one of hydrogen gas, inert gas, or other combustible gas into the combustor 114. In FIG. 1, the second circuit 110 of the fuel nozzle 104 induces the water or methane into the combustor 114. In FIG. 1, the first outlet 118 of the nozzle tip 116 provides air flow into the combustor 114. In some examples, the second outlet 120 of the nozzle tip 116 is in connection with the second circuit 110 of the fuel nozzle 104 to provide the water or methane to the combustor 114 based on the mode of operation. In some such examples, the second outlet 120 is positioned concentrically within the first outlet 118. In some examples, the third outlet 122 is in connection with the first circuit 108 to provide the blend of at least one of hydrogen gas, inert gas, or other combustible gas to the combustor 114. In some such examples, the third outlet 122 is positioned concentrically within the second outlet 120.

In the illustrated example of FIG. 1, the combustor controller 102 starts the gas turbine engine 100 by opening a methane valve (e.g., a natural gas valve) of the fuel metering valve(s) 103 to inject methane through the second circuit 110 and into the combustor 114. In the illustrated example of FIG. 1, the combustor controller 102 opens an inert gas valve and/or an other combustible gas valve of the fuel metering valve(s) 103 to inject the inert gas and/or other combustible gas through the first circuit 108 as the gas turbine engine 100 accelerates to a synchronized idle speed. In some such examples, the inert gas and/or other combustible gas purges the first circuit 108 and the combustor 114 prior to inducing the hydrogen gas. Specifically, purging the first circuit 108 and the combustor 114 removes residual hydrogen gas and deoxygenates the gas turbine engine 100 to prevent undesired combustion. In some examples, nitrogen gas, which has a relatively low cost of procurement compared to other gases, is implemented as the inert gas to purge the first circuit 108 and the combustor 114. In some examples, carbon dioxide is implemented as the inert gas that purges the first circuit 108 and the combustor 114.

In the illustrated example of FIG. 1, the gas turbine engine 100 circuit breaker 101 is closed after the gas turbine engine 100 accelerates to the synchronized idle speed so the gas turbine engine 100 can accept loads. In some examples, purging the first circuit 108 and the combustor 114 with the other combustible gas can speed up the process of accelerating the gas turbine engine 100 to the synchronized idle speed. In the illustrated example of FIG. 1, after the circuit breaker 101 of the gas turbine engine 100 is closed, the combustor controller 102 closes the methane valve to terminate injections of methane through the second circuit 110. Further, the combustor controller 102 opens a water valve of the fuel metering valve(s) 103 to transport water into the combustor 114 via the second circuit 110. Further, the combustor controller 102 opens a hydrogen valve of the fuel metering valve(s) 103 to induce hydrogen gas into the combustor 114 through the first circuit 108 after water is induced into the combustor 114.

In the illustrated example of FIG. 1, the combustor controller 102 further opens the hydrogen valve and begins closing the inert gas valve or the other combustible gas valve of the fuel metering valve(s) 103 to increase a percentage of hydrogen gas in the blend of at least one of hydrogen gas, inert gas, or other combustible gas transported into the combustor 114 through the first circuit 108. In some examples, the combustor controller 102 further opens the water valve to increase a volumetric flow rate of water injected into the second circuit 110 and the combustor 114. In some examples, the percentage of hydrogen gas in the first circuit 108 can increase to up to 100% hydrogen gas as the gas turbine engine 100 operates at, or between, 10% and/or 100% of the rated power. In some such examples, the volumetric flow rate of water in the second circuit 110 increases as the percentage of hydrogen gas increases in the blend of at least one of hydrogen gas, inert gas, or other combustible gas and/or the power output of the gas turbine engine increases.

In the illustrated example of FIG. 1, to reduce power and/or shut down the gas turbine engine 100, the combustor controller 102 closes the hydrogen valve of the fuel metering valve(s) 103 to decrease the percentage of hydrogen gas in the blend of at least one of hydrogen gas, inert gas, or other combustible gas transported through the first circuit 108 as the power output and/or load of the gas turbine engine 100 decreases. Further, the combustor controller 102 closes the water valve of the fuel metering valve(s) 103 to decrease the volumetric flow rate of water transported through the second circuit 110. In some examples, the combustor controller 102 opens the circuit breaker 101 before re-purging the first circuit 108 of the fuel nozzle 104 and the combustor 114 with the inert gas. In some such examples, the gas turbine engine 100 does not accept loads while re-purging and/or preparing to power down. In some examples, water purges the combustor 114 in response to the inert gas supply being depleted. In the illustrated example of FIG. 1, the gas turbine engine 100 can power down after the first circuit 108 and the combustor 114 have been re-purged. In some examples, the combustor controller 102 shuts down the gas turbine engine 100 when a hydrogen gas supply is depleted. In some such examples, the combustor controller 102 compares the hydrogen gas supply to a minimum threshold supply of the hydrogen gas to determine if the gas turbine engine 100 is to shut down.

Figure 2:
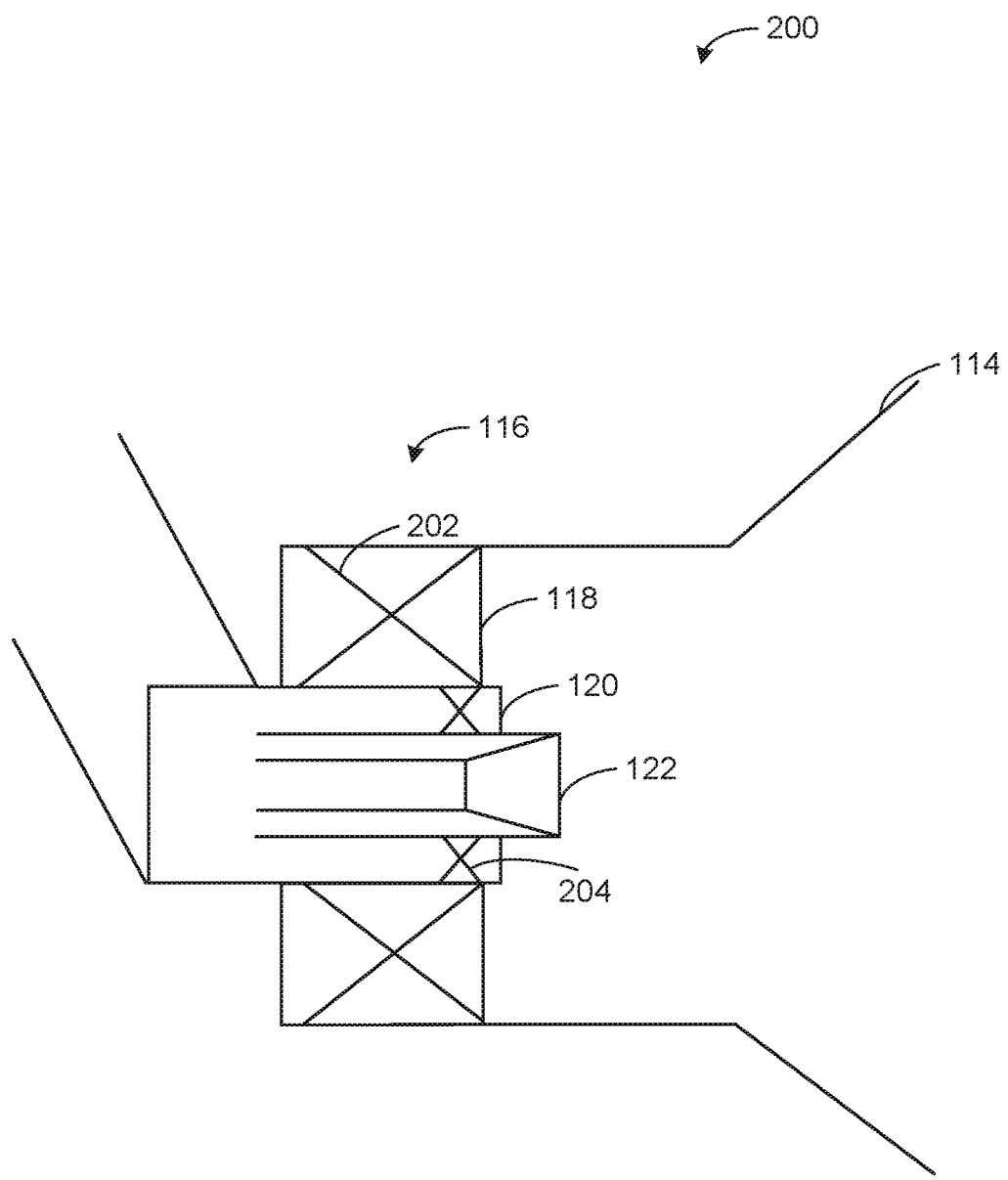
FIG. 2 is a magnified view of an example fuel nozzle tip of the example gas turbine engine of FIG. 1.

FIG. 2 is a magnified view 200 of the fuel nozzle tip 116 in connection with the combustor 114 of the gas turbine engine 100 of FIG. 1. In the illustrated example, the fuel nozzle tip 116 includes the first outlet 118, the second outlet 120, and the third outlet 122 of FIG. 1. In FIG. 2, the fuel nozzle tip 116 further includes an air swirler 202 positioned within the first outlet 118 and a water swirler 204 positioned within the second outlet 120.

In the illustrated example of FIG. 2, the air swirler 202 mixes the water or methane with the blend of at least one of hydrogen gas, inert gas, or other combustible gas. In some such examples, the air swirler 202 provides an advantageous atomization of the gases to enhance a capability of the combustor 114 to burn the methane, hydrogen, and/or other combustible gas. Further, the air swirler 202 provides air flow into the combustor 114. In the illustrated example of FIG. 2, the water swirler 204 reduces (e.g., minimizes) a size of water droplets and provides the water with turbulence to mix with the blend of at least one of hydrogen gas, inert gas, or other combustible gas. In some examples, the water swirler 204 disperses the water to quench a temperature within the combustor 114. Accordingly, the water provides the gas turbine engine 100 with thermal protection by providing a thermal barrier between the hydrogen gas and hardware associated with fuel nozzle 104 and/or the combustor 114. In some such examples, the air swirler 202 and/or the water swirler 204 enhance a capability and/or durability of the combustor 114 and, in turn, the gas turbine engine 100.

Figure 3A:
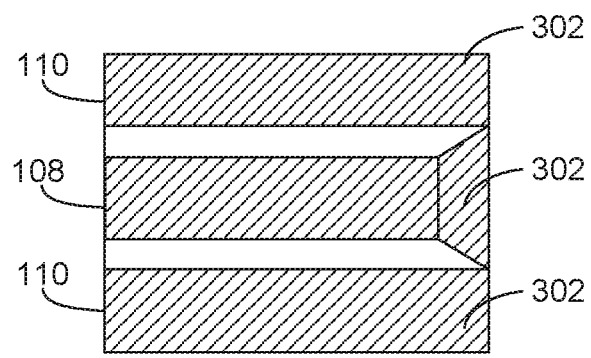
FIGS. 3A-C illustrate first example fluid blends that flow through the example fuel nozzle of the example gas turbine engine of FIGS. 1 and/or 2.
Figure 3B:
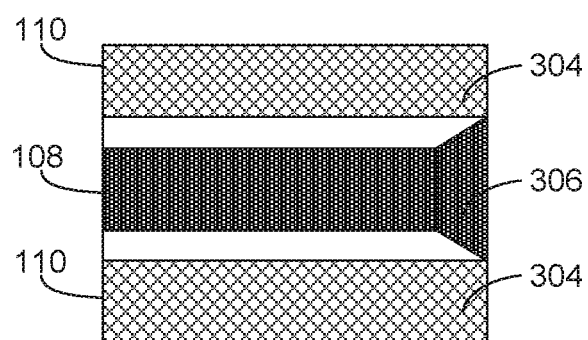
Figure 3C:
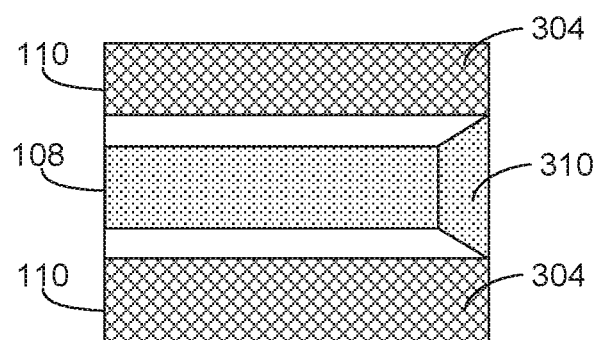

FIGS. 3A-C illustrate example fluid blends that flow through the fuel nozzle 104 of the gas turbine engine 100 of FIGS. 1 and/or 2. Specifically, FIGS. 3A-C illustrate operating phases of the blend of at least one of hydrogen gas, inert gas, or other combustible gas transported through the first circuit 108 and the water or methane transported through the second circuit 110 in accordance with operations of the gas turbine engine 100. FIG. 3A illustrates example fluid blends that flow through the fuel nozzle 104 to start and accelerate the gas turbine engine 100 to a synchronized idle speed (e.g., a grid stabilized speed, a part power condition, etc.). In the illustrated example of FIG. 3A, the gas turbine engine 100 is started with the blend of at least one of hydrogen gas, inert gas, or other combustible gas transported through the first circuit 108 and methane 302 transported through the second circuit 110. In FIG. 3A, methane 302 is implemented as the blend of at least one of hydrogen gas, inert gas, or other combustible gas transported through the first circuit 108. In FIG. 3A, methane 302 purges the first circuit 108 and accelerates the gas turbine engine 100 to the synchronized idle speed. In some examples, methane 302 is only injected through the first circuit 108 to accelerate the gas turbine engine 100 to the synchronized idle speed. In some examples, an inert gas, such as nitrogen or carbon dioxide, purges the first circuit 108 instead of methane 302, as discussed further in association with FIG. 4A. In FIG. 3A, methane 302 is also transported through the second circuit 110 to accelerate the gas turbine engine 100 to the synchronized idle speed.

In the illustrated example of FIG. 3B, the circuit breaker 101 of the gas turbine engine 100 is closed so the gas turbine engine 100 can accept loads. In FIG. 3B, injections of methane 302 through the second circuit 110 are terminated. In FIG. 3B, water 304 is induced into the combustor 114 through the second circuit 110. In FIG. 3B, water 304 is induced into the combustor 114 prior to inducing hydrogen gas to manage the flame within the combustor 114, provide nitrogen oxide emissions abatement, and/or protect hardware associated with the combustor 114. Specifically, water 304 cools down a temperature of the flame within the combustor 114 to reduce nitrogen oxide emissions. Additionally or alternatively, the water 304 provides a thermal barrier between the flame of the combustor 114 and hardware associated with the combustor 114.

In the illustrated example of FIG. 3B, hydrogen gas is induced into the combustor 114 through the first circuit 108 to provide a mixture of hydrogen gas and methane 306. In other words, the blend of at least one of hydrogen gas, inert gas, or other combustible gas transitions from methane 302 to the mixture of hydrogen gas and methane 306. In the illustrated example of FIG. 3B, a percentage of hydrogen gas in the mixture of hydrogen gas and methane 306 and a volumetric flow rate of water 304 simultaneously increase to maintain or increase the power output of the gas turbine engine 100.

In the illustrated example of FIG. 3C, hydrogen gas 310 is transported into the combustor 114 through the first circuit 108 and water 308 is transported into the combustor 114 through the second circuit 110. For example, the mixture of hydrogen gas and methane 306 transitions to hydrogen gas 310. In the illustrated example, the gas turbine engine 100 operates with the hydrogen gas 310 as fuel while the water 304 reduces a temperature of a flame within the combustor 114 and protects hardware associated with the combustor 114. In some such examples, the gas turbine engine 100 can operate at up to 100% rated power. In some examples, utilizing hydrogen gas 310 as fuel instead of other hydrocarbons, such as methane, reduces carbon emissions of the gas turbine engine 100.

Figure 4A:
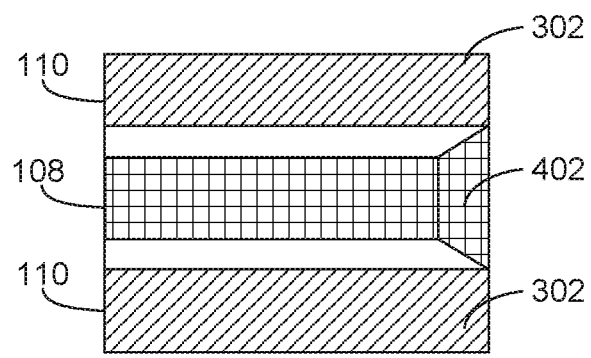
FIGS. 4A-C illustrate second example fluid blends that flow through the example fuel nozzle of the example gas turbine engine of FIGS. 1 and/or 2.
Figure 4B:
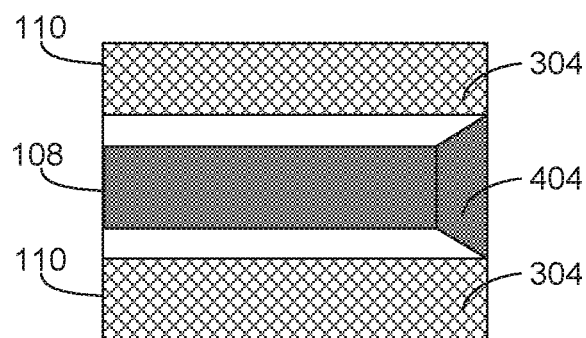
Figure 4C:
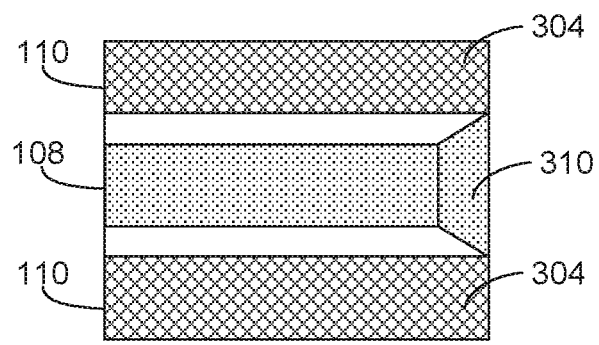

FIGS. 4A-C illustrate additional and/or alternative fluid blends that flow through the fuel nozzle 104 of the gas turbine engine 100 of FIGS. 1 and/or 2. Specifically, FIGS. 4A-C illustrate operating phases of the blend of at least one of hydrogen gas, inert gas, or other combustible gas transported through the first circuit 108 and the water or methane transported through the second circuit 110 in accordance with operations of the gas turbine engine 100. In the illustrated example of FIG. 4A, methane (e.g., natural gas) 302 is transported through the second circuit 110 to start and accelerate the gas turbine engine 100 to the synchronized idle speed. In FIG. 4A, nitrogen gas 402 is implemented as the blend of at least one of hydrogen gas, inert gas, or other combustible gas transported through the first circuit 108. Specifically, nitrogen gas 402 purges the first circuit 108 and the combustor 114 prior to inducing hydrogen gas to prevent undesired combustion in the gas turbine engine 100. In some alternative examples, carbon dioxide is implemented as the blend of at least one of hydrogen gas, inert gas, or other combustible gas to purge the first circuit 108 and the combustor 114 instead of, or in addition to, nitrogen gas 402.

In the illustrated example of FIG. 4B, the gas turbine engine 100 has accelerated to the synchronized idle speed and the associated circuit breaker 101 is closed so the gas turbine engine 100 can accept loads. In FIG. 4B, injections of methane 302 through the second circuit 110 are terminated. In FIG. 4B, water 304 is induced into the combustor 114 through the second circuit 110. In FIG. 4B, hydrogen gas is induced into the combustor 114 through the first circuit 108 to provide a mixture of nitrogen gas and hydrogen gas 404 to the combustor 114. In other words, the blend of at least one of hydrogen gas, inert gas, or other combustible gas transitions from nitrogen gas 402 to the mixture of nitrogen gas and hydrogen gas 404. In the illustrated example of FIG. 4B, a percentage of hydrogen gas in the mixture of nitrogen gas and hydrogen gas 404 and a volumetric flow rate of water 304 simultaneously increase to maintain or increase a power output of the gas turbine engine 100.

In the illustrated example of FIG. 4C, hydrogen gas 310 is transported into the combustor 114 through the first circuit 108 and water 304 is transported into the combustor 114 through the second circuit 110. In other words, the blend of at least one of hydrogen gas, inert gas, or other combustible gas transitions from the mixture of nitrogen gas and hydrogen gas 404 to hydrogen gas 310. In FIG. 4C, the gas turbine engine 100 operates with hydrogen gas 310 as fuel and water 308 manages the flame within the combustor 114 to quench a temperature within the combustor, provide nitrogen oxide emissions abatement, and/or protect hardware associated with the combustor 114. In FIG. 4C, the gas turbine engine 100 can operate with a power output at, or between, 10% and 100% rated power.

Figure 5:
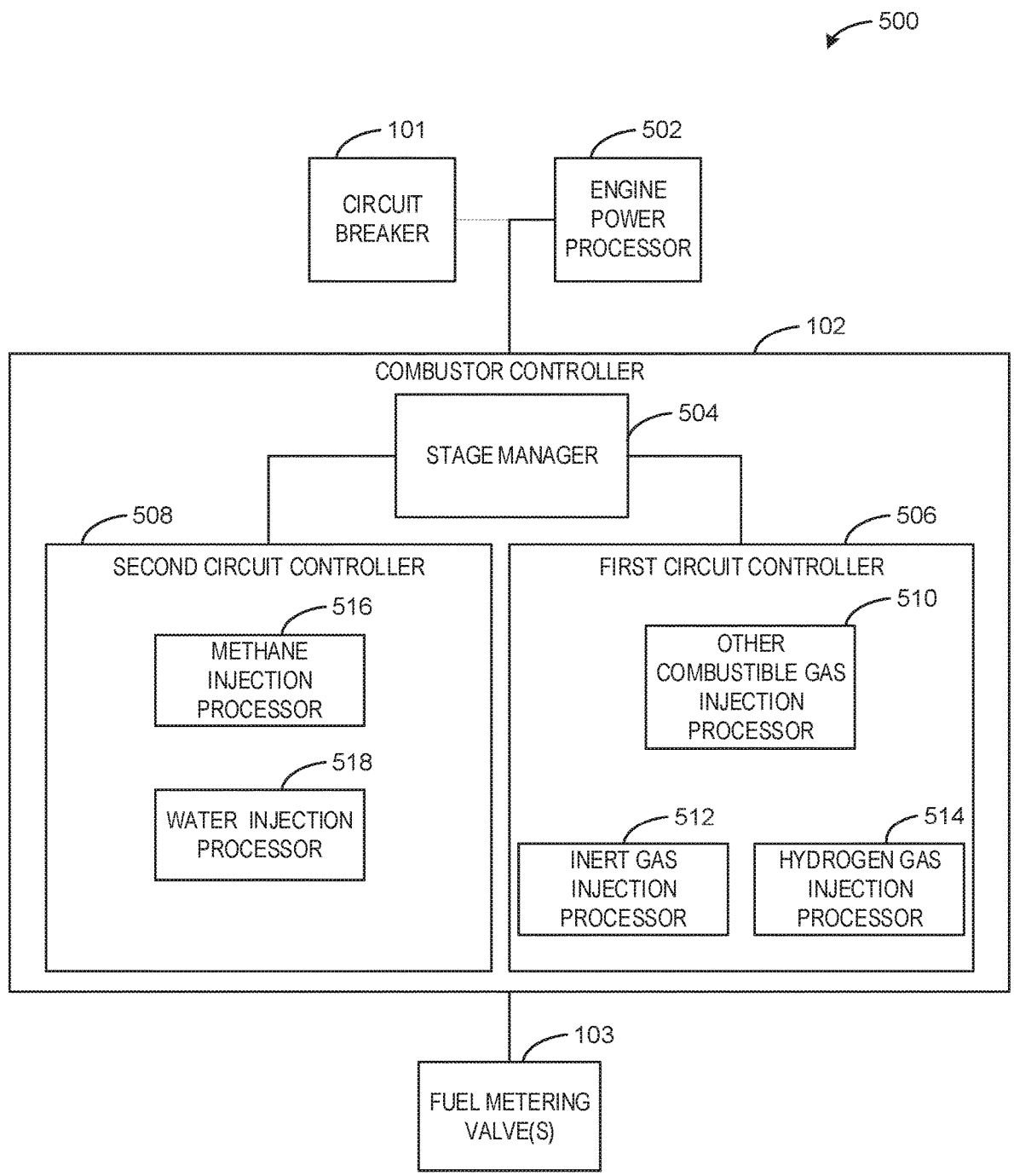
FIG. 5 is a block diagram of an example combustor controller of the example gas turbine engine and associated fuel nozzle of FIGS. 1, 2, 3, and/or 4.

FIG. 5 is a block diagram 500 of the combustor controller 102 of the gas turbine engine 100 of FIGS. 1, 2, and/or 3. In the illustrated example of FIG. 5, the combustor controller 102 includes a stage manager 504, a first circuit controller (e.g., an inside circuit controller) 506, and a second circuit controller (e.g., an outside circuit controller) 508. In FIG. 5, the inside circuit controller 506 includes an other combustible gas injection processor 510, an inert gas injection processor 512, and a hydrogen gas injection processor 514. In FIG. 5, the outside circuit controller 508 includes a methane (e.g., natural gas) injection processor 516, and a water injection processor 518. The block diagram 500 further includes the circuit breaker 101, an engine power processor 502 and the fuel metering valve(s) 103 in communication with the combustor controller 102.

In the illustrated example of FIG. 5, the combustor controller 102 receives a power output, a load, and/or an operating frequency of the gas turbine engine 100 from the engine power processor 502. For example, the engine power processor 502 can determine the power output of the gas turbine engine 100 in megawatts (MW). Additionally, the engine power processor 502 can determine an operating frequency of the gas turbine engine 100 in revolutions per minute (rpm) and/or Hertz (Hz). In some examples, the engine power processor 502 determines and/or controls other parameters, such as a temperature, pressure, fuel flow, etc., of the gas turbine engine 100. Further, the engine power processor 502 communicates the power output, load, and/or operating frequency of the gas turbine engine 100 to the combustor controller 102. In FIG. 5, the circuit breaker 101 indicates a configuration thereof to the combustor controller 102. In FIG. 5, the combustor controller 102 controls the blend of at least one of hydrogen gas, inert gas, or other combustible gas transported through the first circuit (e.g., the inside circuit) 108 and a volumetric flow of the water or methane transported through the second circuit (e.g., the outside circuit) 110 to control the power output of the gas turbine engine 100 based on communications with the circuit breaker 101 and the engine power processor 502.

In the illustrated example of FIG. 5, the stage manager 504 of the combustor controller 102 compares the power output and/or load of the gas turbine engine 100 determined by the engine power processor 502 to a rated power and/or operating frequency capability of the gas turbine engine 100. In FIG. 5, the stage manager 504 determines a stage of operation of the gas turbine engine 100 based on the comparison between the power output and/or the operating frequency of the gas turbine engine 100 and the rated power and/or maximum operating frequency of the gas turbine engine 100. In some examples, the stage manager 504 determines the stage of operation of the gas turbine engine 100 based on the configuration of the circuit breaker 101.

In the illustrated example of FIG. 5, the stage manager 504 determines that the gas turbine engine 100 is operating at the synchronized idle speed when the circuit breaker 101 is closed. In some examples, the stage manager 504 determines that the gas turbine engine 100 is operating at a synchronized idle speed (e.g., synchronized to the grid) when the power output is approximately 10% of the rated power and/or when the operating frequency of the gas turbine engine 100 reaches approximately 50 Hz. For example, when the rated power of the gas turbine engine 100 is 50 MW, the stage manager 504 determines that the gas turbine engine 100 is operating at the synchronized idle speed when the power output determined by the engine power processor 502 is greater than or equal to 5 MW. In some examples, the engine power processor 502 indicates to the combustor controller 102 that the gas turbine engine 100 has closed the circuit breaker 101 to accept loads when the gas turbine engine 100 is operating at the synchronized idle speed. In some examples, the gas turbine engine 100 utilizes up to 100% hydrogen gas as fuel after closing the circuit breaker 101 to accept loads.

In the illustrated example of FIG. 5, the stage manager 504 inverts the operating stages to shut down the gas turbine engine 100. In some examples, a shutdown indication is communicated to the combustor controller 102 via a user interface, a sensor associated with the supply, etc. In some examples, the engine power processor 502 provides an emergency shut down indication to the combustor controller 102 in which case the stage manager 504 determines that the gas turbine engine 100 is to terminate operations (e.g., power down). For example, when the gas turbine engine 100 has a depleted supply of hydrogen gas, an emergency shutdown can occur. Further, the shutdown indication from the engine power processor 502 can indicate if the shutdown is to occur in substantially real time or over a period of time. In some examples, the gas turbine engine 100 reduces power and opens the circuit breaker 101 so the gas turbine engine 100 cannot accept a load. In some examples, the combustor controller 102 purges the gas turbine engine 100 after the circuit breaker opens and before the gas turbine engine 100 powers down.

In the illustrated example of FIG. 5, the stage manager 504 is in communication with the first circuit controller 506 and the second circuit controller 508. In FIG. 5, the first circuit controller 506 determines the blend to be transported through the first circuit 108 and the second circuit controller 508 determines a volume of water or methane to be transported through the second circuit 110 based on the determined stage of operation of the gas turbine engine 100.

In the illustrated example of FIG. 5, the stage manager 504 provides a purge indication to the first circuit controller 506 when the gas turbine engine 100 is operating within the initial power stage. In some examples, the inert gas injection processor 512 determines that an associated inert gas (e.g., nitrogen, carbon dioxide, etc.) is to purge the first circuit 108 and the combustor 114 in response to the first circuit controller 506 receiving the purge indication. In some examples, the other combustible gas injection processor 510 determines that an associated other combustible gas (e.g., methane, propane, etc.) is to purge the first circuit 108 and the combustor 114 in response to the inside circuit controller 506 receiving the purge indication.

Further, the combustor controller 102 controls the inert gas or other combustible gas that is to be induced into the combustor 114 via the fuel metering valve(s) 103. In some examples, the combustor controller 102 triggers an inert gas valve and/or an other combustible gas valve of the fuel metering valve(s) 103 to open and, thus, induce the inert gas and/or other combustible gas into the first circuit 108. In turn, the fuel nozzle 104 injects the inert gas and/or other combustible gas into the combustor 114.

Additionally, the stage manager 504 provides an initial power indication to the second circuit controller 508 when the gas turbine engine 100 is operating within the initial power stage. In FIG. 5, the methane injection processor 516 determines that methane is to be induced into the second circuit 110 and the combustor 114 in response to the second circuit controller 508 receiving the initial power indication. Further, the combustor controller 102 triggers the fuel metering valve(s) 103 to induce methane into the combustor 114 through the second circuit 110. In some examples, the combustor controller 102 opens a methane valve of the fuel metering valve(s) 103 and, in turn, injects methane into the second circuit 110. In turn, the fuel nozzle 104 injects the methane into the combustor 114. In other examples, the other combustible gas injected through the first circuit 110 accelerates the gas turbine engine 100 to the synchronized idle speed. In such examples, the methane does not need to be induced into the combustor through the second circuit 110.

In the illustrated example of FIG. 5, the stage manager 504 provides a closed circuit breaker 101 indication to the first circuit controller 506 and the second circuit controller 508 when the engine power processor 502 indicates that the gas turbine engine 100 is operating at the synchronized idle speed and supporting a load. In FIG. 5, the water injection processor 518 determines that water is to be induced into the combustor 114 in response to the second circuit controller 508 receiving the closed circuit breaker 101 indication. Additionally, the hydrogen gas injection processor 514 determines that hydrogen gas is to be induced into the combustor 114 in response to the first circuit controller 506 receiving the closed circuit breaker 101 indication.

Further, the combustor controller 102 controls the fuel metering valve(s) 103 to induce through water the second circuit 110 followed by hydrogen gas through the first circuit 108. Specifically, the combustor controller 102 opens a water valve in connection with the second circuit 110 followed by a hydrogen valve in connection with the first circuit 108 to induce water and hydrogen gas into the combustor 114. In FIG. 5, the water is induced prior to the hydrogen gas to manage the flame within the combustor 114 and provide nitrogen oxide emissions abatement. In FIG. 5, injections of methane through the second circuit 110 are terminated prior to inducing the water.

In the illustrated example of FIG. 5, the first circuit controller 506 increases a percentage of hydrogen gas in the blend of at least one of hydrogen gas, inert gas, or other combustible gas. Specifically, the hydrogen gas injection processor 514 indicates an increasing volume of hydrogen gas to be induced into the first circuit 108 to the combustor controller 102. In some examples, the inert gas injection processor 512 or the other combustible gas injection processor 510 indicates to the combustor controller 102 a decreasing volume of inert gas or other combustible gas to be induced into the first circuit 108 in combination with the increasing volume of hydrogen gas. In FIG. 5, the combustor controller 102 triggers the fuel metering valve(s) 103 to close (e.g., partially close, fully close, etc.) an inert gas valve or an other combustible gas valve and simultaneously open (e.g., partially open, fully open, etc.) a hydrogen gas valve. In turn, the fuel nozzle 104 injects the blend of at least one of hydrogen gas, inert gas, or other combustible gas through the first circuit 108 into the combustor 114.

In FIG. 5, the water injection processor 518 indicates an increasing volume of water to be induced through the second circuit 110 to the combustor controller 102 in response to the second circuit controller 508 receiving the closed circuit breaker 101 indication. In FIG. 5, the combustor controller 102 triggers the fuel metering valve(s) 103 to fully close a methane valve and open (e.g., partially open, fully open, etc.) a water valve in response to methane being cleared from the second circuit 110.

In the illustrated example of FIG. 5, the combustor controller 102 increases the percentage of hydrogen gas in the blend of at least one of hydrogen gas, inert gas, or other combustible gas induced through the first circuit 108 to up to 100% hydrogen gas after the circuit breaker 101 is closed. In some such examples, the gas turbine engine 100 can operate with 100% hydrogen gas as fuel when the power output of the gas turbine engine 100 is greater than or equal to 10% of the rated power of the gas turbine engine 100. In FIG. 5, the combustor controller 102 increases the volumetric flow rate of water transported into the combustor 114 through the second circuit 110 after the circuit breaker 101 is closed. Further, a volume of the blend of at least one of hydrogen gas, inert gas, or other combustible gas and/or the volumetric flow rate of water induced into the combustor 114 is based on the power output of the gas turbine engine 100. For example, the volume of the blend of at least one of hydrogen gas, inert gas, or other combustible gas and the volume of water induced into the combustor 114 increase as the power output of the gas turbine engine 100 increases.

In the illustrated example of FIG. 5, the combustor controller 102 shuts down the gas turbine engine 100 by inverting the process of adjusting the blend of at least one of hydrogen gas, inert gas, or other combustible gas transported through the first circuit 108 and the water or methane transported through the second circuit 110. In some examples, the combustor controller 102 reduces the volume of the blend of at least one of hydrogen gas, inert gas, or other combustible gas and the volume of water induced into the combustor 114. In some examples, the combustor controller 102 reduces the percentage of hydrogen gas in the blend of at least one of hydrogen gas, inert gas, or other combustible gas. In some examples, the combustor controller 102 opens the circuit breaker 101 and terminates injections of hydrogen gas as the power output of the gas turbine engine 100 reaches approximately 10% of the rated power. In some such examples, the combustor controller 102 purges the first circuit 108 and the combustor 114 with the inert gas to prevent undesired combustion. Further, the combustor controller 102 triggers the fuel metering valve(s) 103 to gradually terminate injections after the first circuit 108 and the combustor 114 have been purged.

In the illustrated example of FIG. 5, during an emergency shutdown and/or a loss of hydrogen gas supply of the gas turbine engine 100, the stage manager 504 provides a shutdown indication to the first circuit controller 506 and the second circuit controller 508. In some examples, the hydrogen gas injection processor 514 indicates a supply of hydrogen gas is depleted to the combustor controller 102 and the gas turbine engine 100 is to power down. In FIG. 5, the hydrogen gas injection processor 514 of the first circuit controller 506 indicates that hydrogen injections are to be terminated to the combustor controller 102. In some examples, the combustor controller 102 triggers the circuit breaker 101 to open so the gas turbine engine 100 does not accept loads in response to the supply of hydrogen gas being depleted. Additionally, the inert gas injection processor 512 indicates to the combustor controller 102 that the inert gas is to be induced to purge the first circuit 108 and the combustor 114. Further, the combustor controller 102 triggers the fuel metering valve(s) 103 to terminate injections of hydrogen gas and induce the inert gas into the combustor 114. For example, the combustor controller 102 closes a hydrogen valve and at least partially opens an inert gas valve of the fuel metering valve(s) 103.

Figure 6:
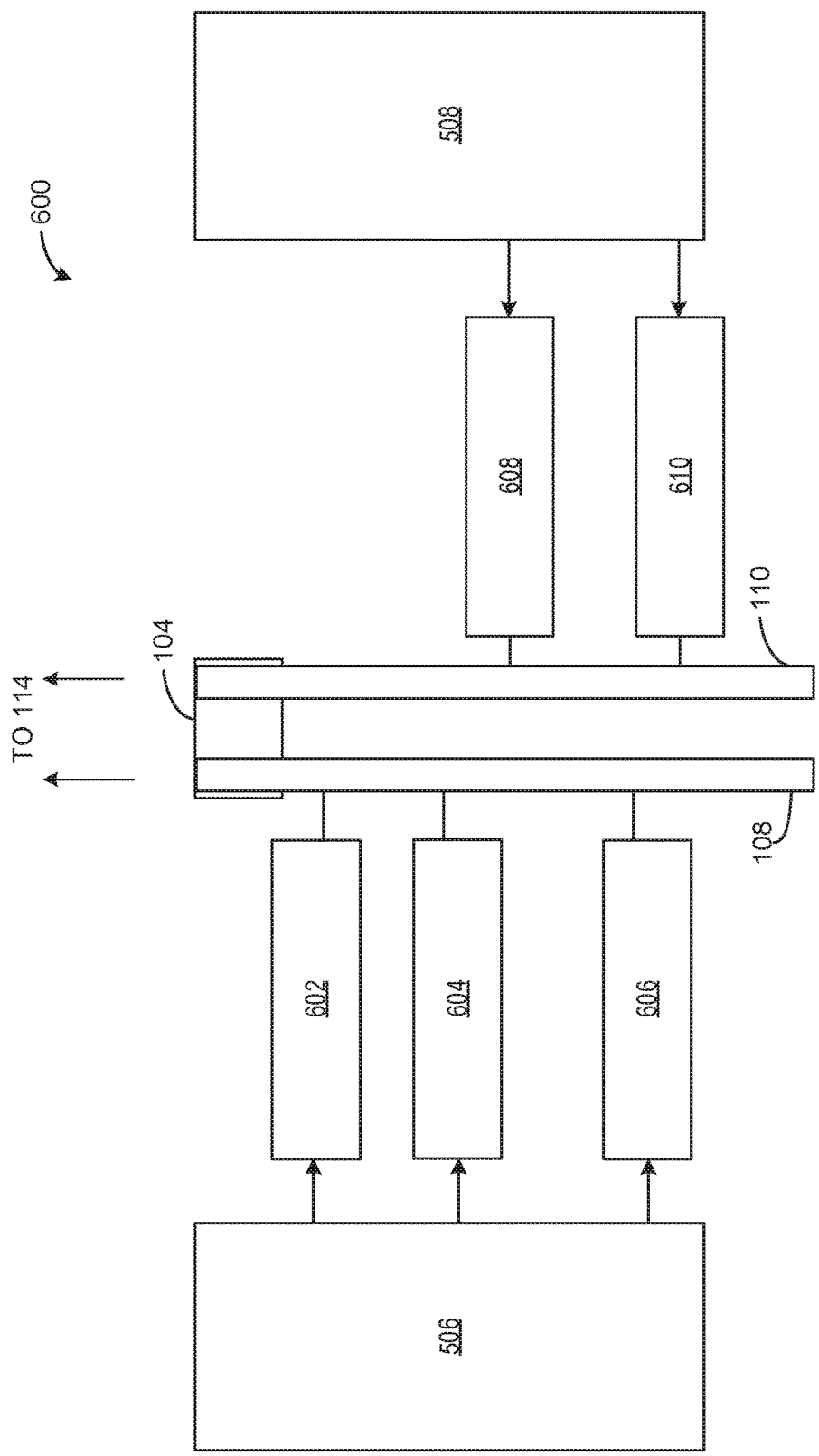
FIG. 6 is a block diagram of a first example schematic of the example fuel nozzle of the example gas turbine engine of FIGS. 1, 2, 3, and/or 4.

FIG. 6 is a block diagram of a schematic 600 of the fuel nozzle 104 of the gas turbine engine 100 of FIGS. 1, 2, 3, and/or 4. In the illustrated example, the fuel nozzle 104 includes at least a portion of the first and the second circuits 108, 110. In FIG. 6, the first circuit controller 506 is in communication with a hydrogen gas valve 602, an inert gas valve 604, and an other combustible gas valve 606. Further, the second circuit controller 508 is in communication with a methane (e.g., natural gas) valve 608 and a water valve 610. In some examples, the hydrogen gas valve 602, the inert gas valve 604, the other combustible gas valve 606, the methane valve 608, and/or the water valve 610 are positioned between a supply and the first or second circuit 108, 110. In FIG. 6, the hydrogen gas valve 602, the inert gas valve 604, and the other combustible gas valve 606 are in connection with the first circuit 108. Further, the methane valve 608 and the water valve 610 are in connection with the second circuit 110.

In the illustrated example of FIG. 6, the first circuit controller 506 controls the blend of at least one of hydrogen gas, inert gas, or other combustible gas transported through the first circuit 108. Specifically, the first circuit controller 506 controls a position of the hydrogen gas valve 602, the inert gas valve 604, and/or the other combustible gas valve 606 to control the blend of at least one of hydrogen gas, inert gas, or other combustible gas. In some examples, the first circuit controller 506 adjusts a position of the hydrogen valve 602, the inert gas valve 604, and/or the other combustible gas valve 606 to adjust a composition of the blend of at least one of hydrogen gas, inert gas, or other combustible gas. For example, the first circuit controller 506 can open the inert gas valve 604 or the other combustible gas valve 606 to purge the first circuit 108. Further, the first circuit controller 506 can open the hydrogen gas valve 602 at a rate and close the inert gas valve 604 or other combustible gas valve 606 at the same rate, or a different rate, to transition the gas turbine engine 100 to operate with hydrogen gas as fuel.

In the illustrated example of FIG. 6, the second circuit controller 508 controls the water or methane transported through the second circuit 110. In some examples, the second circuit controller 508 adjusts a position of the methane valve 608 and/or the water valve 610. Specifically, the second circuit controller 508 controls a position of the methane valve 608 and the water valve 610 to inject water or methane into the combustor 114. For example, the second circuit controller 508 can open the methane valve 608 to accelerate the engine to a synchronized idle speed. Further, the second circuit controller 508 can close the methane valve 608 and open the water valve 610 as the gas turbine engine 100 transitions to operate with hydrogen gas as fuel. In some examples, the gas turbine engine 100 operates with hydrogen gas as fuel with a power output between 10% and 100% rated power.

Figure 7:
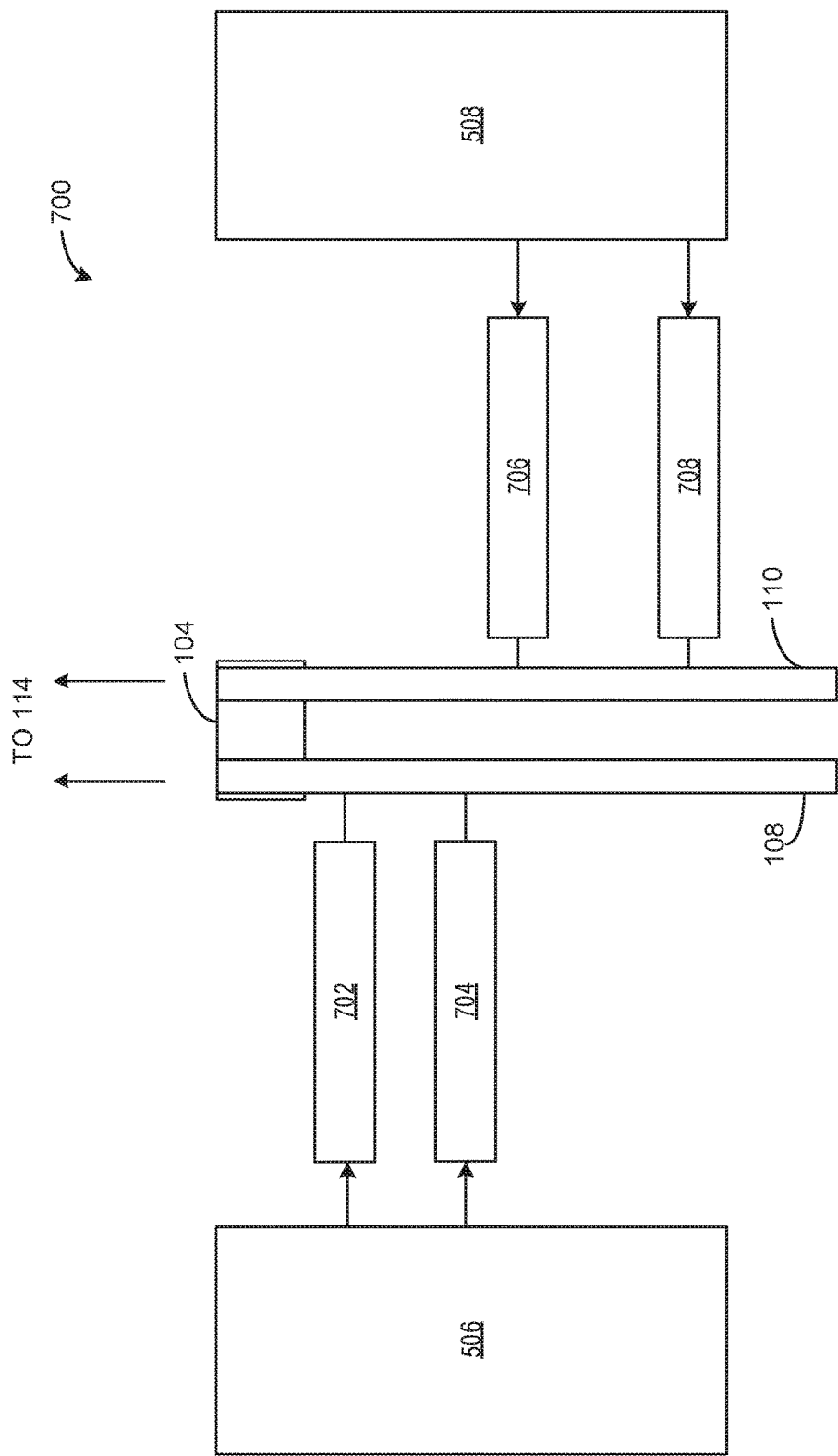
FIG. 7 is a block diagram of second example schematic of the example fuel nozzle of the example gas turbine engine of FIGS. 1, 2, 3, and/or 4.

FIG. 7 is a block diagram of another example schematic 700 of the example fuel nozzle 104 of the example gas turbine engine of FIGS. 1, 2, 3, and/or 4. In the illustrated example of FIG. 7, the fuel nozzle 104 at least partially includes the first circuit 108 and the second circuit 110. In FIG. 7, the first circuit controller 506 is in communication with a hydrogen gas valve 702, and a nitrogen valve 704. In FIG. 7, the nitrogen valve 704 is an example implementation of the inert gas valve 604 of FIG. 6. In some alternative examples, the nitrogen valve 704 and/or the inert gas valve 604 is implemented as a carbon dioxide valve. Further the second circuit controller 508 is in communication with a methane valve 706, and a water valve 708. In FIG. 7, the hydrogen gas valve 702 and the nitrogen valve 704 are in connection with the first circuit 108. Further, the methane valve 706 and the water valve 708 are in connection with the second circuit 110. In some examples, the hydrogen gas valve 702, the nitrogen valve 704, the methane valve 706, and the water valve 708 are positioned between a supply and the first or second circuit 108, 110.

In the illustrated example of FIG. 7, the first circuit controller 506 controls a position of the hydrogen gas valve 702 and the nitrogen valve 704 to control a blend of hydrogen gas and nitrogen (e.g., inert gas). In some examples, the first circuit controller 506 adjusts a position of the hydrogen valve 702 and/or the nitrogen valve 704 to adjust a composition of the blend of hydrogen gas and nitrogen. In the illustrated example of FIG. 7, the second circuit controller 508 controls a position of the methane valve 706 and the water valve 708 to induce water or methane into the combustor 114, as discussed in association with FIG. 6.

Figure 8A:
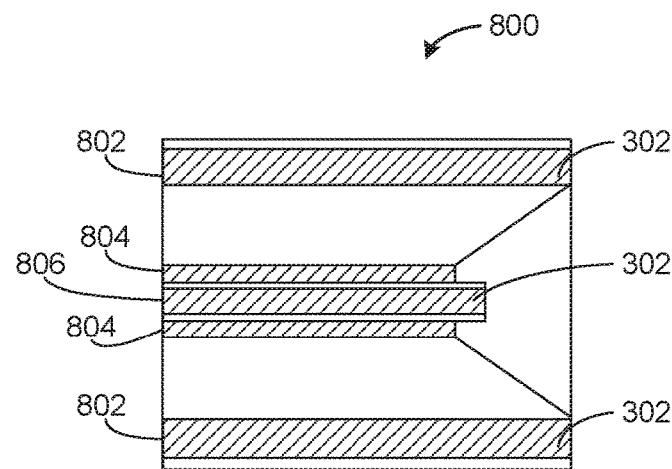
FIGS. 8A-C illustrate example fluid blends that flow through an alternative example fuel nozzle of the example gas turbine engine.
Figure 8B:
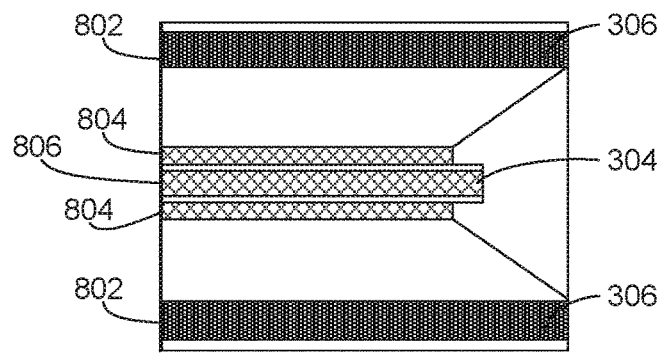
Figure 8C:
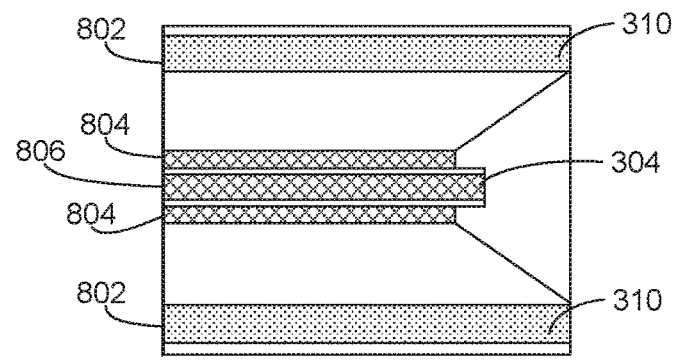

FIGS. 8A-C illustrate fluid blends that flow through an alternative fuel nozzle (e.g., a 3-circuit fuel nozzle) 800 to the combustor 114 of the gas turbine engine 100. Specifically, FIGS. 8A-C illustrate operating phases of the blend of hydrogen gas and inert gas or other combustible gas and the water or methane transported through the alternative fuel nozzle 800. In the illustrated example, the alternative fuel nozzle 800 includes an outside circuit 802, a first inside circuit 804 positioned concentrically within the outside circuit 802, and a second inside circuit 806 positioned concentrically within the first inside circuit 804.

FIG. 8A illustrates example fluid blends that flow through the alternative fuel nozzle 800 to start the gas turbine engine 100 and transition to a synchronized idle speed. In FIG. 8A, the gas turbine engine 100 is started with the blend of hydrogen gas and inert gas or other combustible gas transported through the outside circuit 802 and methane 302 transported through the first and second inside circuits 804, 806. In FIG. 8A, methane 302 is implemented the blend of hydrogen gas and inert gas or other combustible gas to start the gas turbine engine 100. Accordingly, methane 302 is transported through the outside circuit 802, the first inside circuit 804, and the second inside circuit 806 to start and accelerate the gas turbine engine 100 to the synchronized idle speed. Further, methane 302 purges the outside circuit 802 before hydrogen gas is transported through the outside circuit 802. In some other examples, an inert gas, such as nitrogen or carbon dioxide, purges the outside circuit 802 as methane 302 is transported through the first and second inside circuits 804, 806 to accelerate the gas turbine engine 100 to the synchronized idle speed.

FIG. 8B illustrates fluid blends that flow through the alternative fuel nozzle 800 to transition the gas turbine engine 100 to operate using hydrogen gas. In FIG. 8B, hydrogen gas is induced through the outside circuit 802 to provide a mixture of hydrogen gas and methane 306 to the combustor 114. In FIG. 8B, water 304 is induced into the combustor 114 through the first and second inside circuits 804, 806. In other words, the alternative fuel nozzle 800 terminates injections of methane into the combustor 114 through the first and second inside circuits 804, 806 as the gas turbine engine 100 operates by utilizing hydrogen gas as fuel and water 308 as a coolant to suppress nitrogen oxide emissions, quench combustor 114 flame temperature, and protect hardware associated with the combustor 114. In the illustrated example of FIG. 8B, a percentage of hydrogen gas in the mixture of hydrogen gas and methane 306 and a volumetric flow rate of water 304 simultaneously increase as a load of the gas turbine engine 100 increases.

FIG. 8C illustrates fluid blends that flow through the alternative fuel nozzle 800 to transition the gas turbine engine 100 to operate using 100% hydrogen gas 310 as fuel. In FIG. 8C, hydrogen gas 310 is transported through the outside circuit 802 into the combustor 114. In FIG. 8C, the water 304 is transported through the first and second inside circuits 804, 806 to the combustor 114.

Figure 9:
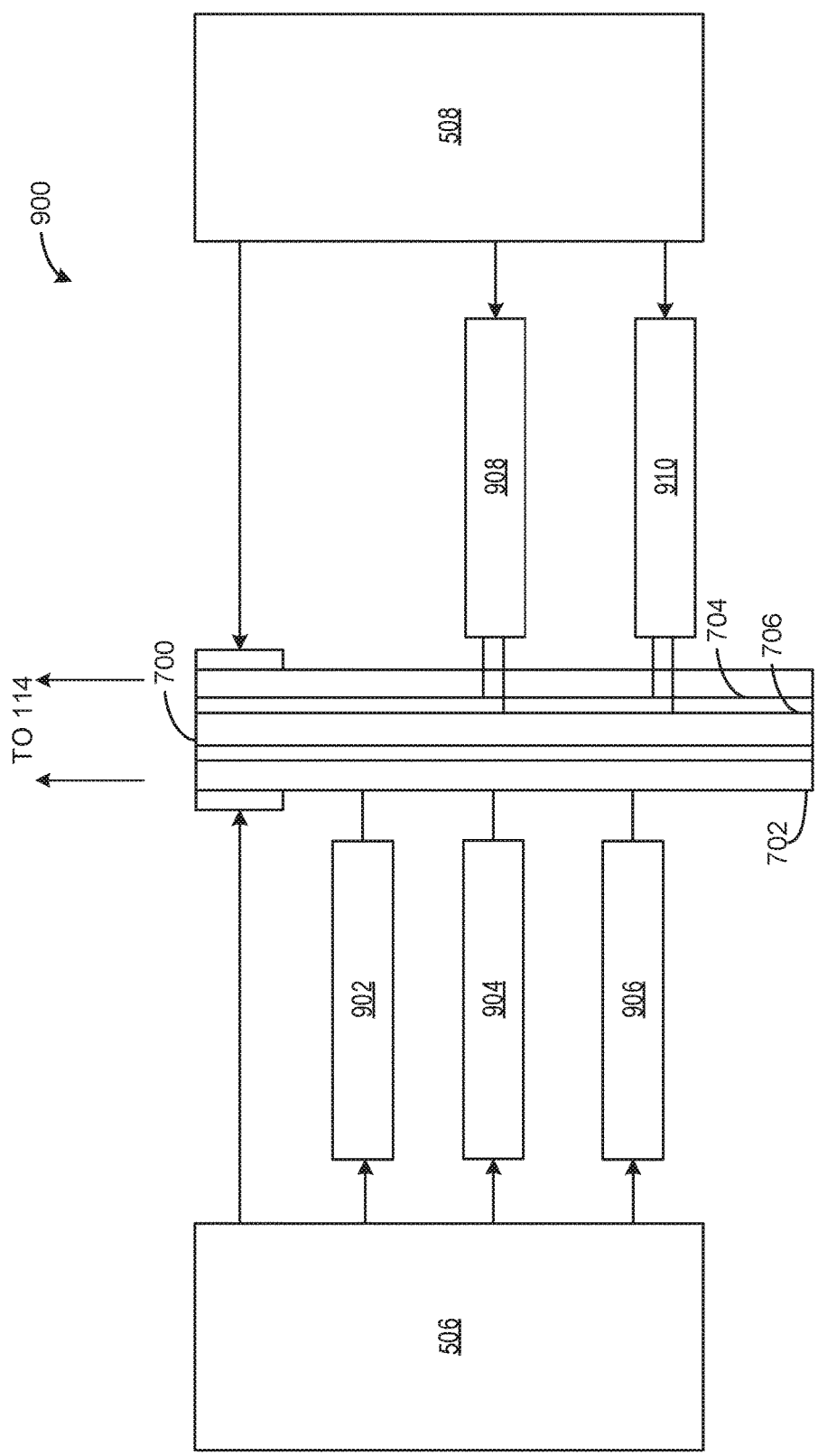
FIG. 9 is a block diagram of an example schematic of the alternative example fuel nozzle of the example gas turbine engine of FIGS. 8A-C.

FIG. 9 is a block diagram of a schematic 900 of the alternative fuel nozzle 800 of FIGS. 8A-C. In the illustrated example of FIG. 9, the fuel nozzle 800 at least partially includes the outside circuit 802, the first inside circuit 804, and the second inside circuit 806. In FIG. 9, the first circuit controller 506 is in communication with the alternative fuel nozzle 800, a hydrogen gas valve 902, an inert gas valve 904, and an other combustible gas valve 906. Further, the second circuit controller 508 is in communication with the alternative fuel nozzle 800, a methane (e.g., natural gas) valve 908, and a water valve 910. In some examples, the hydrogen gas valve 902, the inert gas valve 904, and the other combustible gas valve 906 are positioned between respective supplies and the outside circuit 802. In some examples, the methane valve 908 and the water valve 910 are positioned between respective supplies and the first and second inside circuits 804, 806.

In the illustrated example of FIG. 9, the first circuit controller 506 controls a position of the hydrogen gas valve 902, the inert gas valve 904, and the other combustible gas valve 906 to control the blend of hydrogen gas and inset gas or other combustible gas. In some examples, the first circuit controller 506 adjusts a position of the hydrogen valve 902, the inert gas valve 904, and/or the other combustible gas valve 906 to adjust a composition of the blend of hydrogen gas and inert gas or other combustible gas. In FIG. 9, the second circuit controller 508 controls the water or methane transported through the first and second inside circuits 804, 806. In some examples, the second circuit controller 508 adjusts a position of the methane valve 908 and the water valve 910 to transition between injecting methane or water.

Figure 10:
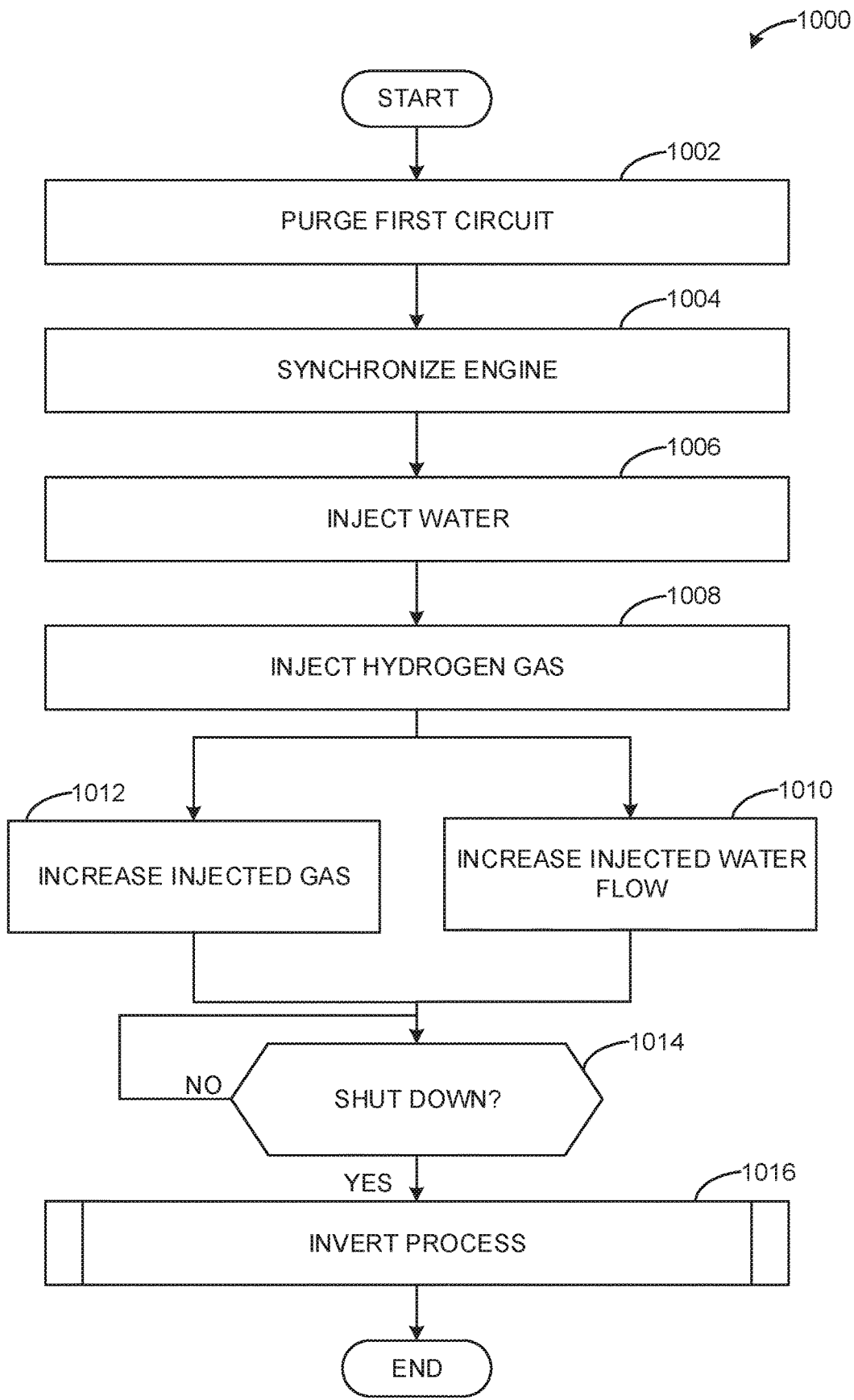
FIG. 10 is a flowchart representative of machine readable instructions which may be executed to implement the example gas turbine engine of FIGS. 1-9.
Figure 11:
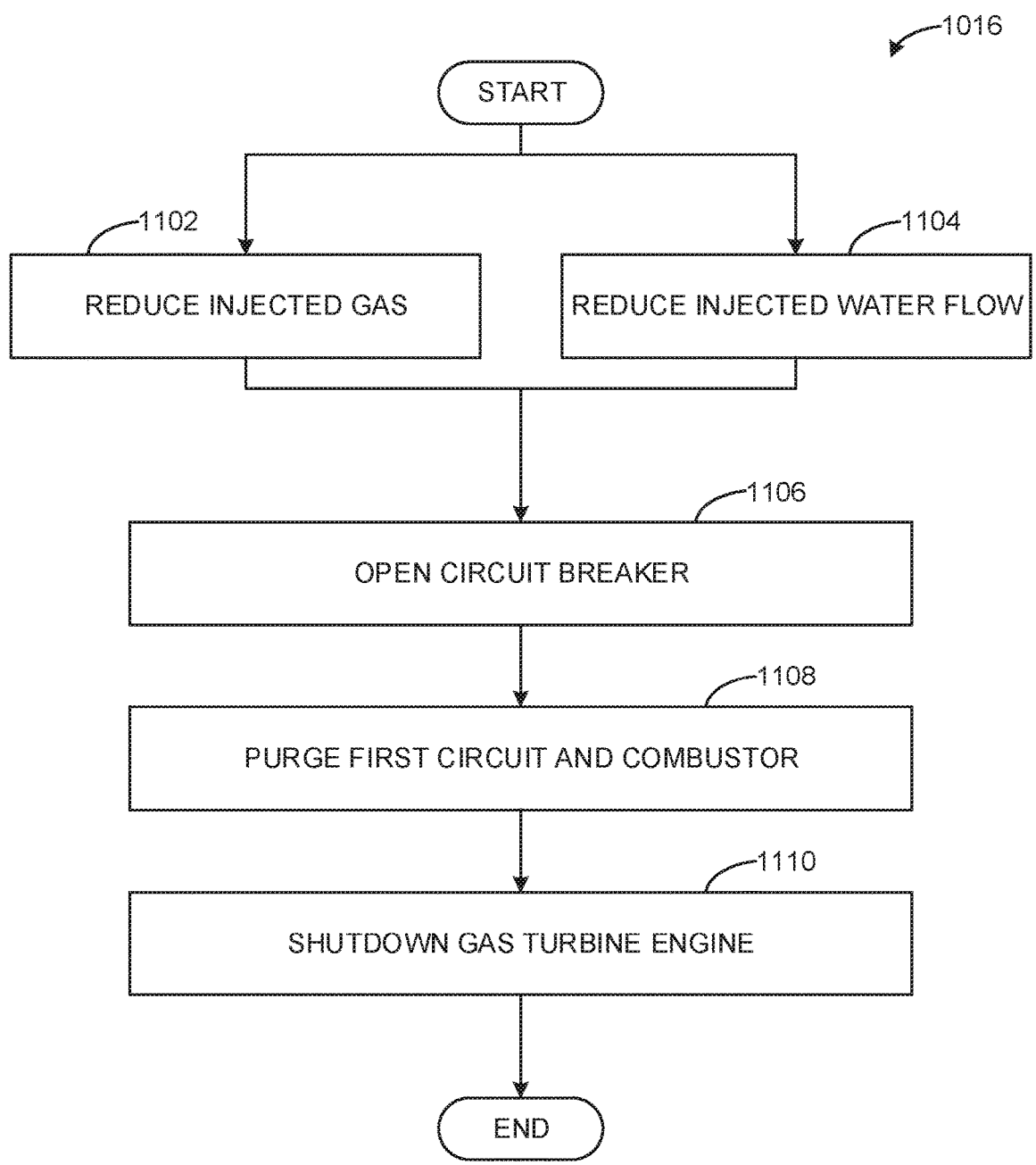
FIG. 11 is a flowchart representative of machine readable instructions which may be executed to implement a power shut down of the example gas turbine engine of FIGS. 1-10.

While an example manner of implementing the combustor controller 102 of FIGS. 1, 5, 6, 7, and/or 9 is illustrated in FIGS. 10 and 11, one or more of the elements, processes and/or devices illustrated in FIGS. 10-11 may be combined, divided, re-arranged, omitted, eliminated and/or implemented in any other way. Further, the example stage manager 504, the example first circuit controller 506, the example outside circuit controller 508, the example other combustible gas injection processor 510, the example inert gas injection processor 512, the example hydrogen gas injection processor 514, the example methane injection processor 516, the example water injection processor 518 and/or, more generally, the example combustor controller 102 of FIGS. 1, 5, 6, 7, and/or 9 may be implemented by hardware, software, firmware and/or any combination of hardware, software and/or firmware. Thus, for example, any of the example stage manager 504, the example first circuit controller 506, the example outside circuit controller 508, the example other combustible gas injection processor 510, the example inert gas injection processor 512, the example hydrogen gas injection processor 514, the example methane injection processor 516, the example water injection processor 518 and/or, more generally, the example combustor controller 102 could be implemented by one or more analog or digital circuit(s), logic circuits, programmable processor(s), programmable controller(s), programmable sensor(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example stage manager 504, the example first circuit controller 506, the example outside circuit controller 508, the example other combustible gas injection processor 510, the example inert gas injection processor 512, the example hydrogen gas injection processor 514, the example methane injection processor 516, the example water injection processor 518 is/are hereby expressly defined to include a non-transitory computer readable storage device or storage disk such as a memory, etc. including the software and/or firmware. Further still, the example combustor controller of FIGS. 1, 5, 6, 7, and/or 9 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the combustor controller 102 of FIGS. 1, 5, 6, 7, and/or 9 is shown in FIGS. 10 and 11. The machine readable instructions may be one or more executable programs or portion(s) of an executable program for execution by a computer processor and/or processor circuitry, such as the processor 1212 shown in the example processor platform 1200 discussed below in connection with FIG. 12. The program may be embodied in software stored on a non-transitory computer readable storage medium such as a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 10 and 11, many other methods of implementing the example combustor controller 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10 and 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 is a flowchart representative of example machine-readable instructions 1000 that can be executed to implement the combustor controller 102 of FIGS. 1, 5, 6, 7, and/or 9. At block 1002, the combustor controller 102 purges the first circuit 108 of the fuel nozzle 104 and the combustor 114. For example, the engine power processor 502 indicates a low power level (e.g., less than 10% rated power) of the gas turbine engine 100 to the combustor controller 102 when the gas turbine engine 100 begins operating. In some examples, the stage manager 504 compares the low power level to the rated power of the gas turbine engine 100 to determine the operating stage of the gas turbine engine 100. In some examples, combustor controller 102 and/or stage manager 504 receives a configuration of the circuit breaker 101. In some such examples, the combustor controller 102 and/or the stage manager 504 determines that the gas turbine engine 100 is in an initial power stage (e.g., a purge stage). Further, the stage manager 504 provides a purge indication to the first circuit controller 506. In some examples, the other combustible gas injection processor 510 and/or the inert gas injection processor 512 of the first circuit controller 506 determines that an other combustible gas and/or an inert gas, respectively, is to be injected through the first circuit 108. In some examples, the combustor controller 102 triggers the fuel metering valve(s) 103 to control the blend of at least one of hydrogen gas, inert gas, or other combustible gas induced into the first circuit 108 and the combustor 114. In some examples, the combustor controller 102 opens the inert gas valve 604, 904 or the nitrogen valve 704 to purge the first circuit 108 of the fuel nozzle 104 and the combustor 114 with the inert gas. In some examples, the combustor controller 102 opens the other combustible gas valve 606, 906 to purge the first circuit 108 of the fuel nozzle 104 and the combustor 114 with the other combustible gas. Further, the other combustible gas transported through the first circuit 108 also accelerates the gas turbine engine 100 during the purge. In some examples, purging deoxygenates and removes residual hydrogen gas from the combustor 114 and the first circuit 108 to prevent undesired combustion.

At block 1004, the combustor controller 102 synchronizes the gas turbine engine 100 to an idle speed. For example, the stage manager 504 provides an initial power stage indication to the second circuit controller 508. In some examples, the methane injection processor 516 of the second circuit controller 508 indicates to the combustor controller 102 that methane (e.g., methane 302) is to be injected into the combustor 114 through the second circuit 110 of the fuel nozzle 104 based on the initial power stage indication. In some examples, the combustor controller 102 triggers the fuel metering valve(s) 103 to induce methane into the second circuit 110 and the combustor 114. In some examples, the combustor controller 102 opens the methane valve 608, 706, 908 to inject methane into the second circuit 110. Further, the methane is injected into the combustor 114 by the fuel nozzle 104 increasing a power output of the gas turbine engine 100. In some examples, the other combustible gas induced into the combustor 114 through the first circuit 108 increases the power output of the gas turbine engine 100 instead of, or in addition to, the methane transported through the second circuit 110

At block 1006, the combustor controller 102 injects water into the combustor 114 through the second circuit 110. For example, the stage manager 504 determines that the gas turbine engine 100 is operating at a synchronized idle speed when the power from the engine power processor 502 is approximately 10% of the rated power of the gas turbine engine 100 and/or the circuit breaker 101 of the gas turbine engine 100 is closed to accept loads. In some examples, the stage manager 504 informs the second circuit controller 508 that the gas turbine engine is operating at the synchronized idle speed and/or the circuit breaker 101 of the gas turbine engine 100 is closed. In some examples, the water injection processor 518 of the second circuit controller 508 indicates to the combustor controller 102 that water is to be induced into the second circuit 110 and the combustor 114 based on the indication from the stage manager 504. Further, the methane injection processor 516 indicates to the combustor controller 102 that injections of methane through the second circuit 110 are to be terminated prior to inducing water into the second circuit 110. In some examples, the combustor controller 102 triggers the fuel metering valve(s) 103 to inject water and terminate injections of methane. In some examples, the combustor controller 102 closes the methane valve 608, 706, 908 to terminate injections of methane and opens the water valve 610, 708, 910 to inject water into the second circuit 110. In other words, the second circuit 110 transitions from inducing methane 302 into the combustor 114 to inducing water 304 into the combustor 114. Further, the water is injected into the combustor 114 by the fuel nozzle 104 to provide flame management and thermal protection to hardware associated with the fuel nozzle 104 and/or the combustor 114. In some examples, the water provides a thermal barrier between the hydrogen gas and the hardware associated with the fuel nozzle 104.

At block 1008, the combustor controller 102 injects hydrogen gas into the combustor 114 through the first circuit 108. In some examples, the stage manager 504 informs the first circuit controller 506 that the circuit breaker 101 of the gas turbine engine 100 is closed and the gas turbine engine 100 is operating at the synchronized idle speed. In some examples, the hydrogen gas injection processor 514 of the first circuit controller 506 indicates to the combustor controller 102 that hydrogen gas is to be induced into the first circuit 108 and the combustor 114 based on the indication from the stage manager 504. In some examples, the combustor controller 102 triggers the fuel metering valve(s) 103 to inject the hydrogen gas. In some examples, the combustor controller 102 opens the hydrogen gas valve 602, 702, 902 to inject the hydrogen gas into the first circuit 108. In other words, the blend of at least one of hydrogen gas, inert gas, or other combustible gas transitions from the other combustible gas (e.g., methane 302) or the inert gas (e.g., nitrogen 402, carbon dioxide) to a mixture of hydrogen gas and the other combustible gas or inert gas (e.g., the mixture of hydrogen gas and methane 306, the mixture of nitrogen and hydrogen gas 404). Further, the hydrogen gas has a lower fuel consumption (pph), reduces carbon emissions, and provides more energy to the gas turbine engine 100 than conventional hydrocarbons, such as methane. After the combustor controller 102 injects hydrogen gas into the combustor 114 through the first circuit 108, the machine-readable instructions 1000 proceed to block 1010 and block 1012 approximately simultaneously.

At block 1010, the combustor controller 102 increases a volumetric flow rate of water injected through the second circuit 110 as the power output (e.g., load) of the gas turbine engine 100 is maintained or increases. In some examples, the combustor controller 102 increases the volumetric flow rate of water injected through the second circuit 110 while also increasing the percentage of hydrogen gas injected through the first circuit 108 (e.g., at block 1012). In some examples, the engine power processor 502 indicates the power output of the gas turbine engine 100 to the combustor controller 102. In some examples, the stage manager 504 informs the second circuit controller 508 of the power output of the gas turbine engine 100. In some examples, the water injection processor 518 of the second circuit controller 508 indicates an increasing volumetric flow of water to be induced into the second circuit 110 and the combustor 114 to the combustor controller 102 based on the power output of the gas turbine engine 100. Accordingly, the volume of water injected into the second circuit 110 and the combustor 114 increases to maintain a temperature of the combustor 114 as the hydrogen maintains or increases the power output of the gas turbine engine 100.

At block 1012, the combustor controller 102 increases a percentage of hydrogen gas in the blend of at least one of hydrogen gas, inert gas, or other combustible gas injected through the first circuit 108 to up to 100% hydrogen gas as the gas turbine engine 100 maintains or increases the power output thereof. In some examples, the combustor controller 102 increases the percentage of hydrogen gas injected through the first circuit 108 while also increasing the volumetric flow rate of water injected through the second circuit 110 (e.g., at block 1010). In some examples, the stage manager 504 informs the first circuit controller 506 of the power output of the gas turbine engine 100. In some examples, the hydrogen gas injection processor 514 of the first circuit controller 506 indicates an increasing volume of hydrogen gas to be induced into the first circuit 108 and the combustor 114 to the combustor controller 102 based on the power output of the gas turbine engine 100. Accordingly, volume of hydrogen gas induced into the first circuit 108 and the combustor 114 increases to maintain or increase the power output of the gas turbine engine 100. Additionally, the volume of inert gas or other combustible gas in the blend of at least one of hydrogen gas, inert gas, or other combustible gas decreases as the volume of hydrogen gas increases. Further, the percentage of hydrogen gas in the blend of at least one of hydrogen gas, inert gas, or other combustible gas increases to up to 100% hydrogen gas when the gas turbine engine 100 is operating at, or between, 10% and/or 100% of the rated power of the gas turbine engine 100. In other words, the blend of at least one of hydrogen gas, inert gas, or other combustible gas transitions from the mixture of hydrogen gas and methane 306 or the mixture of nitrogen and hydrogen gas 404 to hydrogen gas 310 when the gas turbine engine is operating at, or between, 10% and/or 100% rated power.

At block 1014, the engine power processor 502 determines if/when the gas turbine engine 100 is to shut down (e.g., power down). In some examples, the engine power processor 502 increases, decreases, and/or modulates the power output of the gas turbine engine 100 until the shutdown is to occur. If the gas turbine engine 100 is not to shut down, the machine-readable instructions 1000 return to block 1014. If the gas turbine engine 100 is to power down, the machine-readable instructions 1000 proceed to block 1016

At block 1016, the process to operate the gas turbine engine 100 with up to 100% hydrogen gas is inverted to shut down the gas turbine engine 100, as discussed further in association with FIG. 11.

FIG. 11 is a flowchart representative of machine readable instructions that can be executed to implement a power shutdown of the example gas turbine engine 100 of FIGS. 1-9 (e.g., block 1016 of the example of FIG. 10). At block 1102, the combustor controller 102 reduces a percentage and/or volume of hydrogen gas injected through the first circuit 108. In some examples, the combustor controller 102 receives a shutdown indication from the engine power processor 502. In some examples, the engine power processor 502 reduces the power output of gas turbine engine 100 incrementally before providing the shutdown indication to the combustor controller 102. In some examples, the stage manager 504 informs the first circuit controller 506 of the shutdown. In some examples, the hydrogen gas injection processor 514 of the first circuit controller 506 decreases the volume and/or percentage of hydrogen gas in the blend of at least one of hydrogen gas, inert gas, or other combustible gas transported through the first circuit 108. Further, the power output of the gas turbine engine 100 decreases as the volume and/or percentage of hydrogen gas in the blend of at least one of hydrogen gas, inert gas, or other combustible gas decreases.

At block 1104, the combustor controller 102 reduces the volumetric flow rate of water injected into the combustor 114 through the second circuit 110. In some examples, the combustor controller 102 reduces the volumetric flow rate of water injected through the second circuit 110 while simultaneously decreasing the percentage of hydrogen gas injected through the first circuit 108 (e.g., block 1102). In some examples, the stage manager 504 informs the second circuit controller 508 of the shutdown. In some examples, the water injection processor 518 of the second circuit controller 508 decreases the volumetric flow rate of water injected into the second circuit 110 and the combustor 114 as the power output of the gas turbine engine 100 is reduced.

At block 1106, the combustor controller 102 opens the circuit breaker 101 of the gas turbine engine 100. In some examples, the combustor controller 102 reduces the power output of the gas turbine engine 100 to approximately 10% of the rated power by reducing the flow of hydrogen gas and water at block 1102 and block 1104. In some examples, the gas turbine engine 100 opens the circuit breaker 101 so the gas turbine engine 100 no longer accepts loads.

At block 1108, the combustor controller 102 purges the first circuit 108 of the fuel nozzle 104 and the combustor 114. For example, the combustor controller 102 receives a purge indication from the engine power processor 502 after the circuit breaker 101 opens. In some examples, the stage manager 504 of the combustor controller 102 informs the first circuit controller 506 of the purge. In some such examples, the inert gas injection processor 512 of the first circuit controller 506 indicates to the combustor controller 102 that the inert gas (e.g., nitrogen, carbon dioxide, etc.) is to be induced into the first circuit 108 to purge the first circuit 108 and the combustor 114. Further, the combustor controller 102 triggers the inert gas valve 604, 904 or the nitrogen valve 704 of the fuel metering valve(s) 103 to open and induce the inert gas to purge the first circuit 108 and the combustor 114. In some examples, purging the first circuit 108 and the combustor 114 is a safety measure that prevents undesired combustion in systems that have communicated hydrogen gas during operations.

At block 1110, the combustor controller 102 shuts down (e.g., powers down) the gas turbine engine 100. For example, the engine power processor 502 indicates that the combustor controller 102 is not to inject the blend of at least one of hydrogen gas, inert gas, or other combustible gas into the first circuit 108 and the water or methane into the second circuit 110. In some examples, the gas turbine engine 100 terminates operations when the combustor controller 102 terminates injections of water and the blend of at least one of hydrogen gas, inert gas, or combustible gas. In some examples, an engine controller performs shuts down the gas turbine engine 100 instead.

Figure 12:
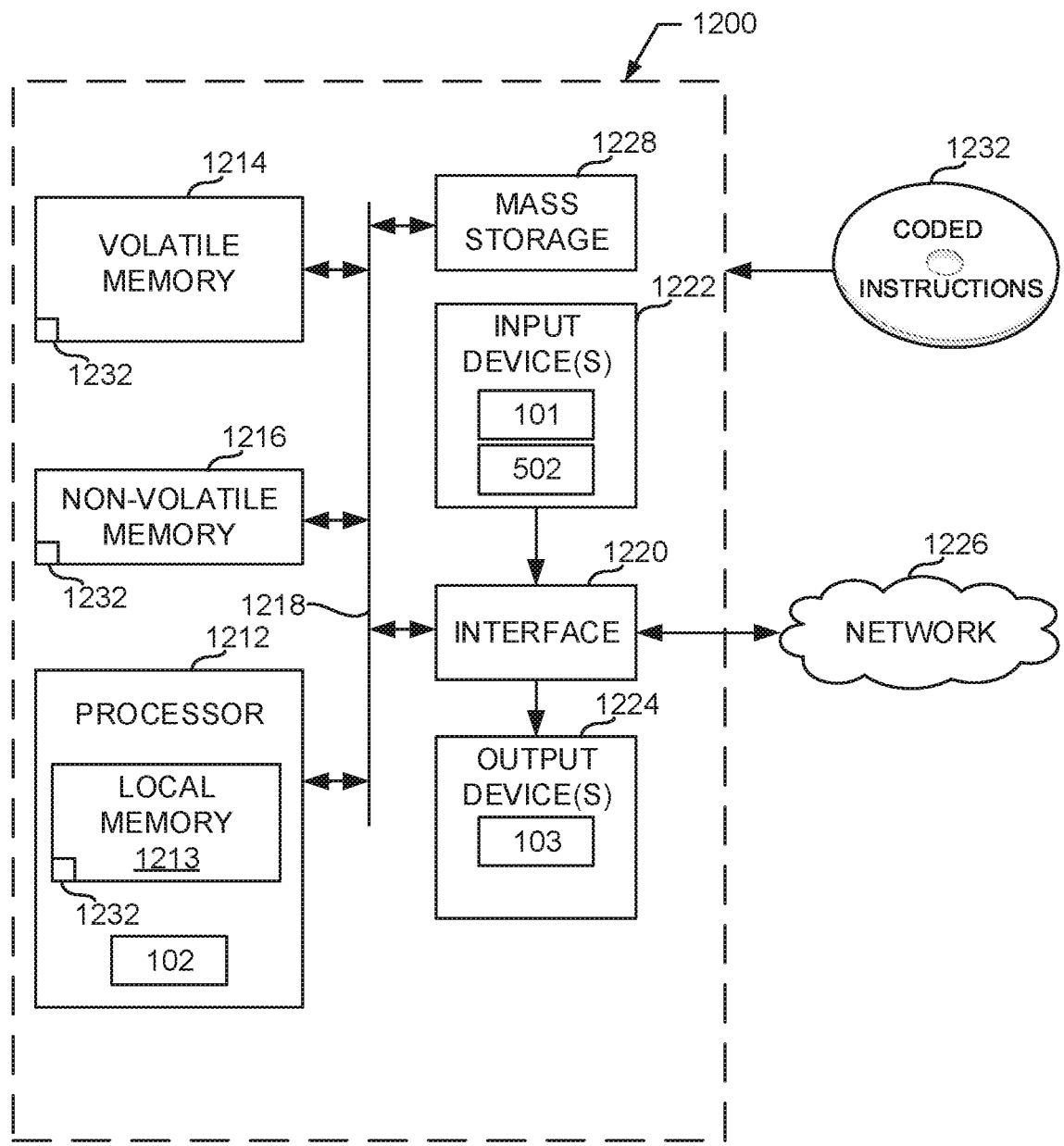
FIG. 12 is a block diagram of an example processing platform structured to execute the instructions of FIGS. 10 and 11 to implement the example gas turbine engine of FIGS. 1-8.

FIG. 12 is a block diagram of an example processor platform 1100 structured to execute the instructions of FIGS. 10 and 11 to implement the combustor controller 102 of FIGS. 1, 5, 6, 7, and/or 9. The processor platform 1200 can be, for example, a server, a personal computer, a workstation, a self-learning machine (e.g., a neural network), a mobile device (e.g., a cell phone, a smart phone, a tablet such as an iPad™), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example stage manager 504, the example first circuit controller 506, the example outside circuit controller 508, the example other combustible gas injection processor 510, the example inert gas injection processor 512, the example hydrogen gas injection processor 514, the example methane injection processor 516, the example water injection processor 518 and/or, more generally, the example combustor controller 102.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, the example engine power processor 502, an audio sensor, a microphone, a camera (still or video), a keyboard, a button, a mouse, a touchscreen, a track-pad, a trackball, isopoint, a user interface, and/or a voice recognition system.

One or more output devices 1224 are also connected to the interface circuit 1220 of the illustrated example. The output devices 1024 can be implemented, for example, by the example fuel metering valve(s) 103, display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, and redundant array of independent disks (RAID) systems.

The machine executable instructions 1232 (e.g., the example instructions 1000 and/or 1016 of FIGS. 10 and 11, etc.) may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that operate a gas turbine engine with up to 100% hydrogen gas as fuel. More specifically, the examples described herein enable a gas turbine engine to consume less fuel (pph), produce less carbon emissions, and generate a greater quantity of energy than conventional gas turbine engines. Further, the examples described herein enable a gas turbine engine to quench a temperature within a combustor, protect hardware associated with the combustor, and provide nitrogen oxide emissions abatement.

Example methods and apparatus to operate a gas turbine engine with hydrogen gas are disclosed herein. Further examples and combinations thereof include the following:

1. A combustor nozzle apparatus of a gas turbine engine comprising a first circuit to transport a blend of at least one of hydrogen gas, inert gas, or other combustible gas from a supply to a gas turbine combustor, the blend of at least one of hydrogen gas, inert gas, or other combustible gas including between 100% hydrogen gas, 100% inert gas, or 100% other combustible gas, a second circuit to transport water from the supply to the gas turbine combustor, and a nozzle tip including a first outlet in connection with the second circuit, the first outlet to provide the water to the gas turbine combustor, and a second outlet in connection with the first circuit, the second outlet concentrically positioned within the first outlet to provide the blend of at least one of hydrogen gas, inert gas, or other combustible gas to the gas turbine combustor.

2. The combustor nozzle apparatus of any preceding clause, wherein the first circuit and the gas turbine combustor are purged by at least one of the inert gas or the other combustible gas prior to transporting the hydrogen gas.

3. The combustor nozzle apparatus of any preceding clause, wherein the inert gas is at least one of nitrogen gas, or carbon dioxide.

4. The combustor nozzle apparatus of any preceding clause, wherein the other combustible gas is at least one of methane or propane.

5. The combustor nozzle apparatus of any preceding clause, wherein a percentage of hydrogen gas increases in the blend of at least one of hydrogen gas, inert gas, or other combustible gas in the first circuit and simultaneously a volumetric flow rate of water increases in the second circuit as the gas turbine maintains or increases a power output.

6. The combustor nozzle apparatus of any preceding clause, wherein at least one of the inert gas or the other combustible gas purges the first circuit and the gas turbine combustor when the gas turbine engine is shutting down.

7. The combustor nozzle apparatus of any preceding clause, wherein the water provides the gas turbine combustor with thermal protection for hardware associated with the gas turbine combustor.

8. The combustor nozzle apparatus of any preceding clause, wherein the thermal protection includes a thermal barrier between the hydrogen gas and the hardware associated with the combustor nozzle.

9. The combustor nozzle apparatus of any preceding clause, further including a third outlet circumferentially surrounding the first outlet, the third outlet including an air swirler to provide air flow to the gas turbine combustor.

10. The combustor nozzle apparatus of any preceding clause, wherein the third outlet of the nozzle tip includes an air swirler to mix the water with the blend of at least one of hydrogen gas, inert gas, or other combustible gas.

11. The combustor nozzle apparatus of any preceding clause, wherein the first outlet of the nozzle tip includes a water swirler to reduce a size of water droplets.

12. The combustor nozzle apparatus of any preceding clause, wherein the combustor nozzle is coupled to a case of the gas turbine engine.

13. The combustor nozzle apparatus of any preceding clause, wherein a first mode of operation corresponds to the first circuit transporting the hydrogen gas, and wherein a second mode of operation corresponds to the first circuit transporting another gas other than the hydrogen gas.

14. The combustor nozzle apparatus of any preceding clause, wherein the second circuit transports methane from the supply to the gas turbine combustor during the second mode of operation.

15. A method to operate a gas turbine engine with up to 100% hydrogen gas as fuel including purging a gas turbine combustor and a first circuit of a combustor nozzle with an inert gas or an other combustible gas, injecting hydrogen gas into the gas turbine combustor through the first circuit of the combustor nozzle, the first circuit including a blend of at least one of hydrogen gas, inert gas, or other combustible gas, wherein the blend of at least one of hydrogen gas, inert gas, or other combustible gas includes between 100% hydrogen gas and 100% inert gas or 100% other combustible gas, injecting water into the gas turbine combustor through a second circuit of the combustor nozzle, and increasing a percentage of hydrogen gas in the blend of at least one of hydrogen gas, inert gas, or other combustible gas to up to 100% hydrogen gas as the gas turbine engine maintains or increases a power output.

16. The method of any preceding clause, further including injecting methane into the gas turbine combustor through the second circuit of the combustor nozzle in response to the first circuit injecting gases other than the hydrogen gas.

17. The method of any preceding clause, wherein a volumetric flow rate of water in the second circuit increases as the percentage of hydrogen gas increases in the blend of at least one of hydrogen gas, inert gas, or other combustible gas.

18. The method of any preceding clause, further including mixing the water with the blend of at least one of hydrogen gas, inert gas, or other combustible gas via at least one of an air swirler or a water swirler at an outlet of the combustor nozzle.

19. The method of any preceding clause, wherein at least one of the air swirler or the water swirler quenches a temperature within the gas turbine combustor.

20. The method of any preceding clause, further including shutting down the gas turbine engine in a case of emergency determined by comparing a supply of the hydrogen gas to a minimum threshold supply of the hydrogen gas.

21. The method of any preceding clause, wherein shutting down the gas turbine engine includes decreasing the percentage of hydrogen gas in the blend of at least one of hydrogen gas, inert gas, or other combustible gas as the gas turbine decreases the power output, decreasing a volumetric flow rate of water in the second circuit, opening a circuit breaker of the gas turbine engine, purging the gas turbine combustor and the first circuit of the combustor nozzle with the inert gas, and powering down the gas turbine engine.

22. An apparatus of a gas turbine engine including a memory, and one or more processors communicatively coupled to the memory, the memory including instructions that, when executed, cause the one or more processors to purge a first circuit of a combustor nozzle and a gas turbine combustor with an inert gas or an other combustible gas, inject hydrogen gas into the gas turbine combustor through the first circuit of the combustor nozzle, the first circuit of the nozzle including a blend of at least one of hydrogen gas, inert gas, or other combustible gas, the blend of at least one of hydrogen gas, inert gas, or other combustible gas including between 100% hydrogen gas and 100% inert gas or 100% other combustible gas, inject water into the gas turbine combustor through a second circuit of the combustor nozzle, and increase a percentage of hydrogen gas in the blend of at least one of hydrogen gas, inert gas, or other combustible gas to up to 100% hydrogen gas as the gas turbine engine maintains or increases a power output.

23. The apparatus of any preceding clause, wherein the instructions, when executed, cause the one or more processors to open at least one of an inert gas valve or an other combustible gas valve to purge the first circuit of the combustor nozzle and the gas turbine combustor with the inert gas or other combustible gas, open a hydrogen valve to inject hydrogen gas into the gas turbine combustor through the first circuit of the combustor nozzle, the first circuit of the nozzle including a blend of at least one of hydrogen gas, inert gas, or other combustible gas, open a water valve to inject water into the gas turbine combustor through the second circuit of the combustor nozzle, and close the inert gas valve or the other combustible gas valve to increase a percentage of hydrogen gas in the blend of at least one of hydrogen gas, inert gas, or other combustible gas, the blend of at least one of hydrogen gas, inert gas, or other combustible gas including between 100% hydrogen gas and 100% inert gas or other combustible gas.

24. The apparatus of any preceding clause, wherein the instructions, when executed, cause the one or more processors to inject methane into the gas turbine combustor through the second circuit of the combustor nozzle in response to the first circuit injecting the inert gas or other combustible gas into the gas turbine combustor.

25. The apparatus of any preceding clause, wherein the instructions, when executed, cause the one or more processors to increase a volumetric flow rate of water in the second circuit as the percentage of hydrogen gas increases in the blend of at least one of hydrogen gas, inert gas, or other combustible gas.

26. The apparatus of any preceding clause, wherein the instructions, when executed, cause the one or more processors to decrease the percentage of hydrogen gas in the blend of at least one of hydrogen gas, inert gas, or other combustible gas as the power output of the gas turbine engine decreases, decrease a volumetric flow rate of water in the second circuit, open a circuit breaker of the gas turbine engine, purge the gas turbine combustor and the first circuit of the combustor nozzle with the inert gas, and power down the gas turbine engine.

27. The apparatus of any preceding clause, wherein the instructions, when executed, cause the one or more processors to shut down the gas turbine engine based on a hydrogen gas supply.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A combustor nozzle apparatus of a gas turbine engine comprising:
 a first circuit to transport a blend of at least one of a hydrogen gas, an inert gas, or an other combustible gas from a supply to a gas turbine combustor, up to 100% of the blend formed of the hydrogen gas, up to 100% of the blend formed of the inert gas, or up to 100% of the blend formed of the other combustible gas;
 a second circuit to transport water from the supply to the gas turbine combustor, a percentage of the hydrogen gas to increase in the blend of at least one of the hydrogen gas, the inert gas, or the other combustible gas in the first circuit and simultaneously a volumetric flow rate of the water to increase in the second circuit as the gas turbine engine maintains or increases a power output; and a nozzle tip including:

a first outlet in connection with the second circuit, the first outlet to provide the water to the gas turbine combustor; and a second outlet in connection with the first circuit, the second outlet concentrically positioned within the first outlet to provide the blend of at least one of the hydrogen gas, the inert gas, or the other combustible gas to the gas turbine combustor.

2. The combustor nozzle apparatus of claim 1, wherein the first circuit and the gas turbine combustor are purged by at least one of the inert gas or the other combustible gas prior to transporting the hydrogen gas.

3. The combustor nozzle apparatus of claim 2, wherein the inert gas is at least one of nitrogen gas, or carbon dioxide.

4. The combustor nozzle apparatus of claim 2, wherein the other combustible gas is at least one of methane or propane.

5. The combustor nozzle apparatus of claim 1, wherein at least one of the inert gas or the other combustible gas purges the first circuit and the gas turbine combustor when the gas turbine engine is shutting down.

6. The combustor nozzle apparatus of claim 1, wherein the water provides the gas turbine combustor with thermal protection for hardware associated with the gas turbine combustor.

7. The combustor nozzle apparatus of claim 6, wherein the thermal protection includes a thermal barrier between the hydrogen gas and the hardware associated with the combustor nozzle.

8. The combustor nozzle apparatus of claim 1, further including a third outlet circumferentially surrounding the first outlet, the third outlet including an air swirler to provide air flow to the gas turbine combustor.

9. The combustor nozzle apparatus of claim 8, wherein the third outlet of the nozzle tip includes the air swirler to mix the water with the blend of at least one of the hydrogen gas, the inert gas, or the other combustible gas.

10. The combustor nozzle apparatus of claim 1, wherein the first outlet of the nozzle tip includes a water swirler to reduce a size of water droplets.

11. The combustor nozzle apparatus of claim 1, wherein the combustor nozzle is coupled to a case of the gas turbine engine.

12. The combustor nozzle apparatus of claim 1, wherein a first mode of operation corresponds to the first circuit transporting the hydrogen gas, and wherein a second mode of operation corresponds to the first circuit transporting another gas other than the hydrogen gas.

13. The combustor nozzle apparatus of claim 12, wherein the second circuit transports methane from the supply to the gas turbine combustor during the second mode of operation.

14. A method to operate a gas turbine engine with up to 100% hydrogen gas as fuel, the method comprising:

purging a gas turbine combustor and a first circuit of a combustor nozzle with an inert gas or an other combustible gas;

injecting the hydrogen gas into the gas turbine combustor through the first circuit of the combustor nozzle, the first circuit including a blend of at least one of the hydrogen gas, the inert gas, or the other combustible gas, wherein up to 100% of the blend is formed of the hydrogen gas, up to 100% of the blend is formed of the inert gas, or up to 100% of the blend is formed of the other combustible gas;

injecting water into the gas turbine combustor through a second circuit of the combustor nozzle; and increasing a percentage of the hydrogen gas in the blend of at least one of the hydrogen gas, the inert gas, or the other combustible gas such that to up to 100% of the blend is formed of the hydrogen gas as the gas turbine engine maintains or increases a power output; and increasing a volumetric flow rate of the water in the second circuit as the percentage of the hydrogen gas increases in the blend of at least one of the hydrogen gas, the inert gas, or the other combustible gas.

15. The method of claim 14, further including injecting methane into the gas turbine combustor through the second circuit of the combustor nozzle in response to the first circuit injecting gases other than the hydrogen gas.

16. The method of claim 14, further including mixing the water with the blend of at least one of the hydrogen gas, the inert gas, or the other combustible gas via at least one of an air swirler or a water swirler at an outlet of the combustor nozzle.

17. The method of claim 14, further including shutting down the gas turbine engine in a case of emergency determined by comparing a supply of the hydrogen gas to a minimum threshold supply of the hydrogen gas.

18. A method to operate a gas turbine engine with up to 100% hydrogen gas as fuel, the method comprising:

purging a gas turbine combustor and a first circuit of a combustor nozzle with an inert gas or an other combustible gas;

injecting the hydrogen gas into the gas turbine combustor through the first circuit of the combustor nozzle, the first circuit including a blend of at least one of the hydrogen gas, the inert gas, or the other combustible gas, wherein up to 100% of the blend is formed of the hydrogen gas, up to 100% of the blend is formed of the inert gas, or up to 100% of the blend is formed of the other combustible gas;

injecting water into the gas turbine combustor through a second circuit of the combustor nozzle;

increasing a percentage of the hydrogen gas in the blend of at least one of the hydrogen gas, the inert gas, or the other combustible gas such that up to 100% of the blend is formed of the hydrogen gas as the gas turbine engine maintains or increases a power output; and shutting down the gas turbine engine including:

decreasing the percentage of the hydrogen gas in the blend of at least one of the hydrogen gas, the inert gas, or the other combustible gas as the gas turbine decreases the power output;

decreasing a volumetric flow rate of the water in the second circuit;

opening a circuit breaker of the gas turbine engine;

purging the gas turbine combustor and the first circuit of the combustor nozzle with the inert gas; and powering down the gas turbine engine.

19. The method of claim 18, further including injecting methane into the gas turbine combustor through the second circuit of the combustor nozzle in response to the first circuit injecting gases other than the hydrogen gas.

20. The method of claim 18, further including mixing the water with the blend of at least one of the hydrogen gas, the inert gas, or the other combustible gas via at least one of an air swirler or a water swirler at an outlet of the combustor nozzle.

* * * * *